United States Patent [19]

Hoda et al.

[11] 4,440,481

[45] Apr. 3, 1984

[54] PHOTOGRAPHIC CAMERA

[75] Inventors: Takeo Hoda; Shigeru Oyokota; Kiyoshi Seigenji, all of Sakai; Nobuyuki Taniguchi, Tondabayashi, all of Japan

[73] Assignee: Minolta Camera Kabushiki Kaisha, Osaka, Japan

[21] Appl. No.: 424,630

[22] Filed: Sep. 27, 1982

[30] Foreign Application Priority Data

Oct. 14, 1981 [JP] Japan ................................ 56-164486

[51] Int. Cl.³ ..................... G03B 17/18; G03B 17/42
[52] U.S. Cl. .................................... 354/171; 354/206; 354/213; 354/214; 354/215; 354/289.12
[58] Field of Search ............... 354/171, 172, 173, 206, 354/213, 214, 215, 289, 21

[56] References Cited

U.S. PATENT DOCUMENTS 4,174,888 11/1979 Hunn et al. .......................... 352/352

FOREIGN PATENT DOCUMENTS 50-113224 9/1975 Japan .
51-140721 12/1976 Japan .

Primary Examiner—Michael L. Gellner
Attorney, Agent, or Firm—Jackson, Jones & Price

[57] ABSTRACT

A photographic camera of a type utilizing a roll of film comprises a camera back lid, a take-up spool for taking up the film therearound, and a plurality of switches incorporated in the take-up spool. The switches built in the take-up spool are all closed, when the film is turned around the spool, to generate a signal inidcative of the fact that the film has no doubt been secured to the spool. An electric circuit is also provided for disabling the film wind-up so long as the camera back lid has not yet been closed even though the film has already loaded in the camera.

17 Claims, 25 Drawing Figures

| Fig.1(a) | Fig.1(b) |
|---|---|
| Fig.1(c) | |

PHOTOGRAPHIC CAMERA

BACKGROUND OF THE INVENTION

The present invention generally relates to a photographic camera and, more particularly, to a photographic camera operable with a 35 mm cartridge film.

In most conventional 35 mm cameras, a roll of film contained in a cartridge is generally load in the camera first by, after the camera back lid has been opened, placing the film cartridge in the film chamber, then drawing out enough film leader from the film cartridge to cover the distance between the film chamber and the film take-up spool, and finally inserting the film leader into the slot of the film take-up spool while allowing the sprocket holes in the film to be engaged by the teeth of the sprocket wheel. With these types of cameras, it is a usual procedure to close the camera back lid after the film has been advanced a certain distance enough to allow the film leader to be turned around the take-up spool to such an extent that a photographer can ascertain that the film leader will no longer disengage from the take-up spool.

However, it has often been observed that most photographers, particularly beginner and armature photographers, are apt to be annoyed about whether or not the film leader has no doubt been engaged, i.e., anchored, to the take-up spool and that some sensitive photographers are apt to allow the film to be advanced a somewhat excessive distance onto the take-up spool to make sure before the camera back lid is closed. Where the film is advanced such excessive distance onto the film take-up spool only to make it sure that the film leader has no doubt been anchored to the take-up spool while the camera back lid has not yet been closed, a few available imaging areas on the film immediately followed by the film leader tend to turn out a failure by exposure to the ambient light, thereby reducing the total number of available imaging areas or frames on the film.

In the case where the photographic cameras are so designed as to be operable with a roll of film of a type wherein a code region H, such as shown in FIG. 2 of the accompanying drawings and including digitally coded areas IH, AH, CH, DH and EH, provided in the film leader along one longitudinal edge thereof for identifying respective photographic characteristics of the film, there is the possibility that some pieces of information coded on the code region H will not be read out by the camera in the event that the film leader is excessively advanced while the camera back lid is opened. In addition to the code perforations in the code region, the film has at least one row of regularly spaced sprocket holes defined therein over the entire length thereof, which sprocket holes may be used to detect the amount of film transported from the film chamber onto the take-up spool by counting the number of sprocket holes passed. One or both of the information contained in the code region and the information given by the sprocket holes can be effectively read out generally if the film is continuously moved, and accordingly, in the case where the manual film winding operation is intermittently carried out as is often observed, the result of the information read-out tends to be confused if the movement of the film is interrupted halfway. Moreover, the continued supply of an electrical power to the information read-out means while the film is not moved results in the waste of the limited electrical power available from a battery source.

SUMMARY OF THE INVENTION

In view of the foregoing, the present invention has for its essential object to provide an improved photographic camera effective to avoid any possible unnecessary wind-up of the film, even though the film leader has been anchored firmly to the take-up spool, unless the camera back lid is closed.

Another important object of the present invention is to provide an improved photographic camera of the type referred to above which requires the minimized supply of an electrical power to a detecting means for detecting the presence or absence of openings, defined in one longitudinal edge of the film, in association with the engagement of the film leader to the take-up spool and also with the selective closure and opening of the camera back lid.

A further object of the present invention is to provide an improved photographic camera of the type referred to above, wherein the minimized supply of the electrical power to the detecting means is realized in association with the operation of a manual film wind-up element.

A still further object of the present invention is to provide an improved photographic camera of the type referred to above, wherein countermeasures are taken to avoid the problem which would arise when the manual film wind-up operation is interrupted halfway during the transportation of the film over a distance enough to advance one frame of the film.

A still further object of the present invention is to provide an improved photographic camera wherein various improvements are made in connection with the capability of detecting whether or not the film leader has been engaged firmly to the take-up spool.

According to one aspect of the present invention, the camera is provided with means for certifying the firm engagement of the film leader to the take-up spool and means for detecting whether the camera back lid is opened or closed whereby when and so long as the camera back lid has not yet been closed even though the film leader has been firmly engaged to the take-up spool, the film wind-up operation can be disabled in response to the certifying and detecting means. The camera is provided also with means for cancelling the condition in which the film wind-up operation is disabled, and this cancelling means is preferably so designed as to automatically cancel the disabled condition of the film wind-up operation in response to, for example, the closure of the camera back lid.

Where the photographic camera is so designed as to detect the passage of the openings, for example, the sprocket holes on the film, the outputs from the respective certifying and detecting means may be utilized to control the electrical power supply to the opening detecting means. Specifically, if arrangement is made such that the electrical power supply to the opening detecting means can be initiated only when and after the camera back lid has been closed subsequent to the firm engagement of the film leader to the take-up spool, the energy saving effect can be achieved.

The output from the above described certifying means can be utilized in many ways according to numerous features of the present invention. By way of example, it may be used to make an indication during the period from the time at which the film leader has been firmly engaged to the take-up spool to the time at which the initial imaging area or frame of the film has been brought into alignment with an exposure station whereat the film can be exposed through the camera objective lens. Moreover, since arrangement is made such that, during the period in which the above described indication is made, a mechanism for automatically stopping the film wind-up cannot be brought into operation so that no repeated depression of the shutter release button may be required until the initial imaging area or frame of the film is brought into alignment with the exposure station without the exposure control being effected, this can be omitted.

According to another aspect of the present invention, the certifying means referred to hereinbefore includes a plurality of switches actuated sequentially as the film leader being turned around the take-up spool and means operable in response to the actuation of all of these switches for generating a signal indicative of the firm engagement of the film leader to the take-up spool. Since this arrangement is for the purpose of certifying the firm engagement of the film leader to the take-up spool at the time of loading the film roll in the camera, it can also be used to ascertain whether or not during the film rewinding operation the film leader has disengaged from the take-up spool or whether or not the film has been rewound until a condition similar to the disengagement of the film leader from the take-up spool is established. Accordingly, according to another feature of the present invention, in order to terminate the indication that the film rewinding operation is in continuation, a signal which may be generated when the condition in which all of the switches have been activated is diminished or when all of the switches are no longer activated can be utilized.

In the camera according to the above described embodiment of the present invention, the energy saving is achieved by controlling the supply of the electrical power to the opening detecting means. However, according to another preferred embodiment of the present invention, the camera is so designed that the supply of the electrical power to the opening detecting means is effected when and so long as the manual film wind-up element is being operated, that is, during the movement of the film, but in the event of the interruption of the operation of the manual film wind-up element with the film consequently held standstill, an output from the opening detecting means can be temporarily stored to provide a substitute signal during the period in which the opening detecting means is held inoperative as a result of the interrupted supply of the electrical power thereto. Although this arrangement has been developed for substantially eliminating the problem which would arise when the manual film wind-up operation is interrupted halfway with the initial imaging area or frame of the film consequently displaced from the exposure station, the following alternative method is also possible to substantially eliminate the same problem. That is, arrangement may be made to allow the manual film wind-up operation to result in the accumulation of a winding force while an actual film wind-up can be performed in response to the termination of an exposure control operation. With this alternative arrangement, the wind-up of the film over a distance required to transport one frame can be automatically executed each time an actual photo-taking completes, and the next succeeding film wind-up operation results in the charging of the shutter and the accumulation of the winding force for the subsequent film wind-up. Therefore, unlike an ordinary, conventional photographic camera, the shutter charging and the execution of the film wind-up take place at different times corresponding to the transportation of one frame on the film. With this alternative arrangement, the intermittent manual film wind-up operation results merely in the intermittent accumulation of the winding force, and the actual film wind-up takes place at a single stroke with no interruption.

BRIEF DESCRIPTION OF THE DRAWINGS

These and other objects and features of the present invention will become clear from the following description taken in conjunction with preferred embodiments thereof with reference to the accompanying drawings, in which.

DETAILED DESCRIPTION OF THE EMBODIMENTS

Figures 1, 1A:
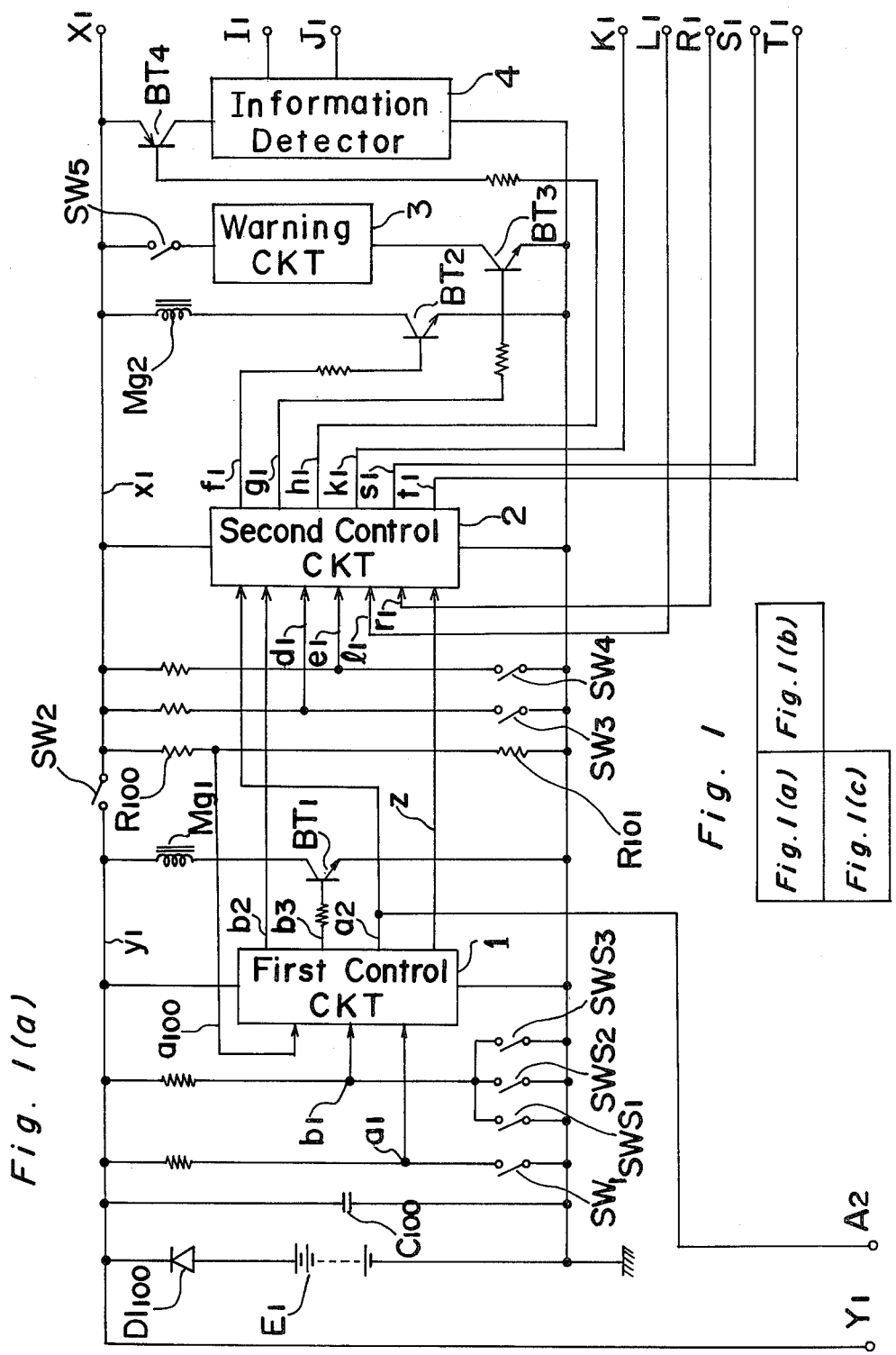
FIG. 1 is composed of FIGS. 1(a), 1(b) and 1(c) and illustrates a block diagram of an electric circuit employed in a photographic camera according to one embodiment of the present invention.
Figure 1B:
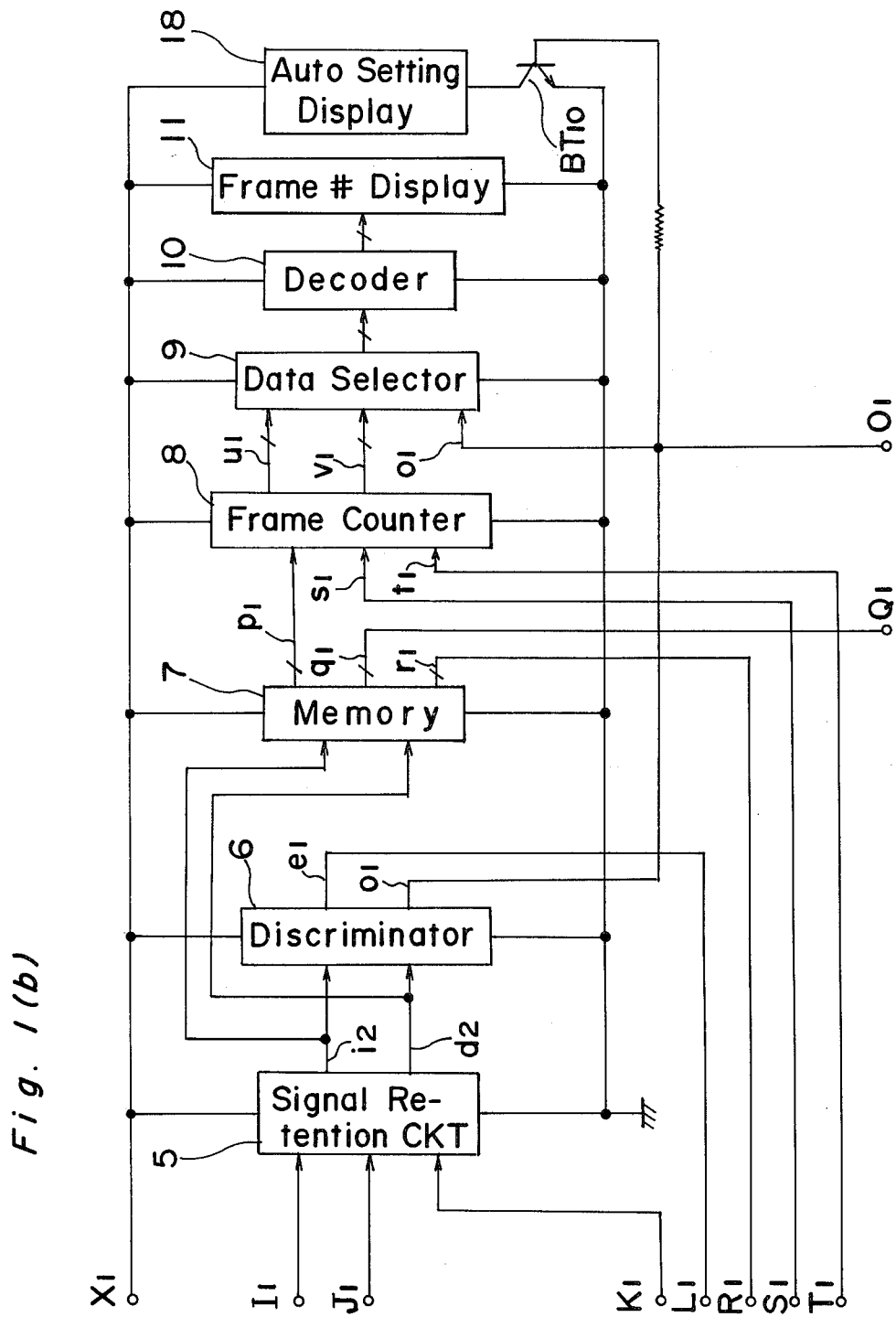
Figure 1C:
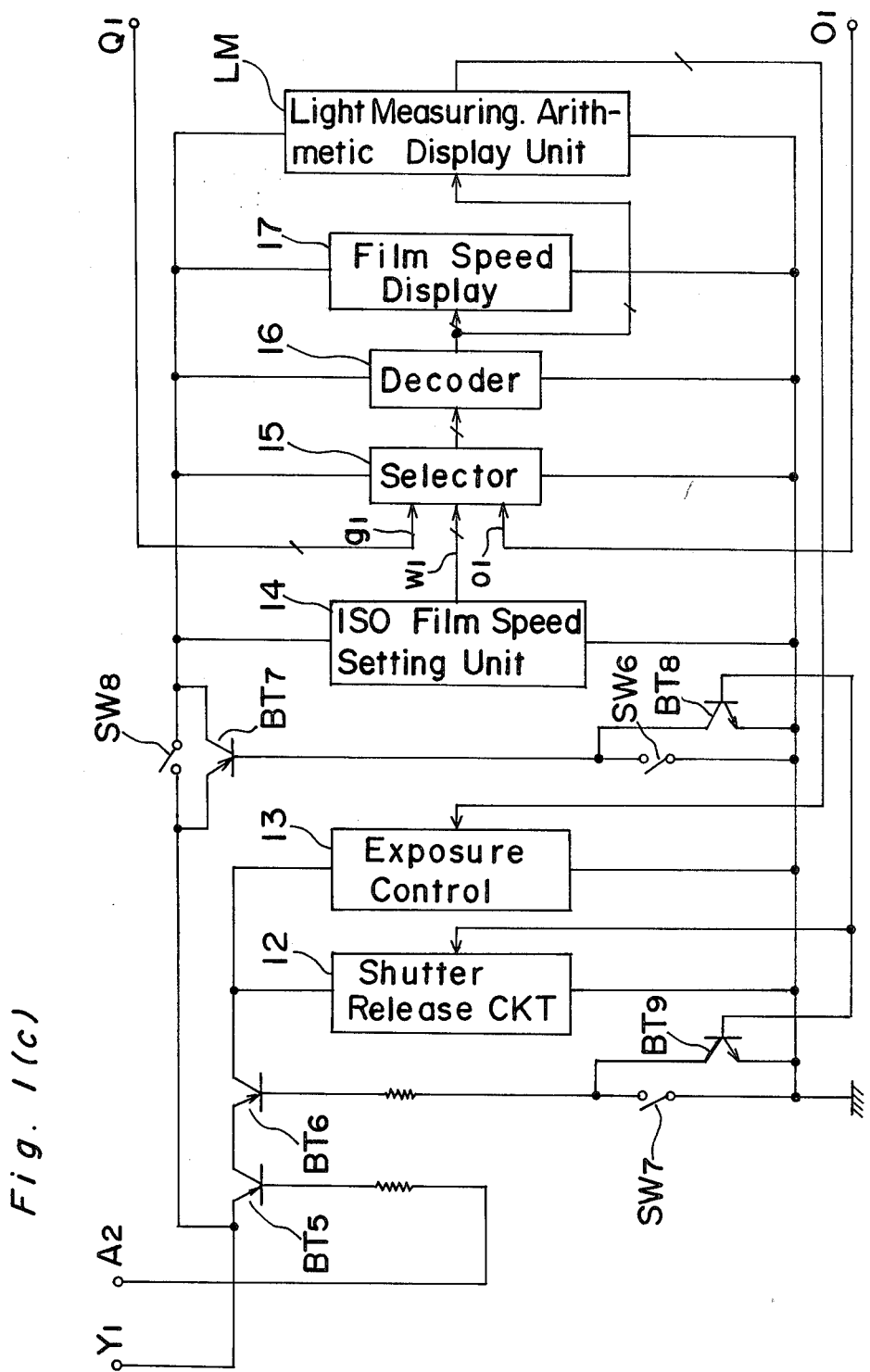

Before the description of the present invention proceeds, it is to be noted that like parts are designated by like reference numerals throughout the accompanying drawings.

Figure 2:
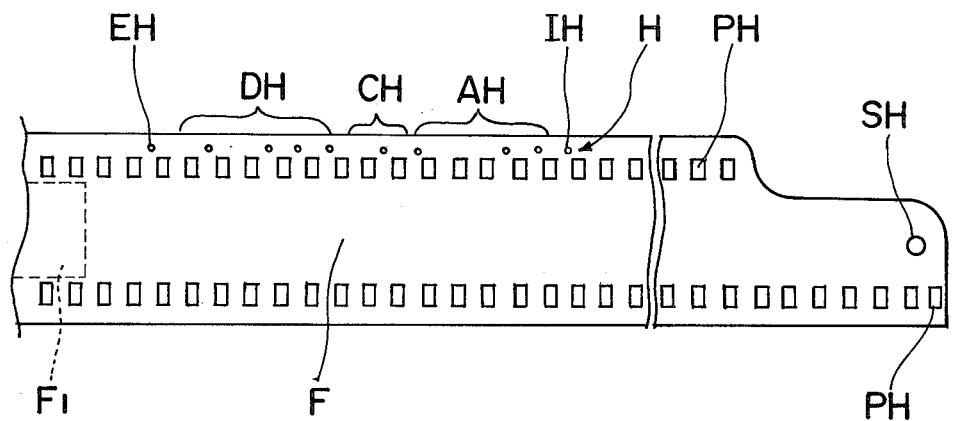
FIG. 2 is an front elevational view of a leader portion of a 35 mm film strip utilizable in the practice of the present invention.

In the first place, a roll of film which is generally contained in a cartridge or a magazine and which the present invention utilizes will be described with reference to FIG. 2. In FIG. 2, there is shown a leader portion of a film strip F having a code region H extending along one longitudinal edge thereof in parallel relation to one of two spaced longitudinal rows of sprocket holes PH. The code region H is comprised of a series of digitally coded areas IH, AH, CH, DH, and EH, the coded areas AH, CH and DH being for identifying respective photographic characteristics of the film strip F whereas the coded areas IH and EH essentially contain respective perforations for identifying the start and the end of the code region H with respect to the direction of movement of the film strip F being wound onto a take-up spool assembly within a photographic camera. These digitally coded areas are located in the leader portion of the film strip F preceding an initial imaging area F1 which, when exposed photographically and then developed, forms the initial image bearing frame. (Accordingly, the term "imaging area" is to be understood as convertible with the term "frame" or "film frame", and the term "frame" or "film frame" is herein frequently used, rather than the term "imaging area", to denote a respective imaging area of the unexposed film strip F.)

The digitally coded areas IH, AH, CH, DH and EH are defined by one or more bit spots between successive sprocket holes PH, and the bit spots in each of the digitally coded areas may be represented by either imperforate spots or one or more perforations, the perforations in one or more bit spots being off-center longitudinal alignment with the row of the sprocket holes PH and situated adjacent the longitudinal edge of the film strip F.

So far shown in FIG. 2, the digitally coded area AH has 5 bit spots for identifying, for example, the speed of the film strip F, some of which bit spots are so perforated as to represent a digitally coded information of "11001" together with the imperforate bit spots in said area AH. The next succeeding digitally coded area CH has 2 bit spots for identifying, for example, the number of available frames of the film strip F, and one of the bit spots in this area CH is so perforated as to represent a digitally coded information of "10" together with the other imperforate bit spot. The digitally coded area DH has, for example, 6 bit spots for identifying one of the available latitude of the film strip F, the type of the film strip and the expiration date on which the term of guarantee offered by a film manufacturer as to the quality of the film strip F will expire.

It is to be noted that the perforation on the coded area EH not only represents the end of the code region H, but also may be used for the parity check purpose.

Referring now to FIG. 1, an electric circuit used in a photographic camera according to the present invention includes an exposure preventive switch SW1 adapted to be closed in response to completion of the operation of a shutter charge mechanism operatively associated with a film wind-up mechanism and also with the film wind-up, and to be opened in response to completion of an exposure control operation, and a plurality of, for example, three, spool switches SWS1, SWS2 and SWS3 built in a film take-up spool assembly as will be described later. These switches SWS1, SWS2 and SWS3 are normally closed switches and are adapted to be closed when the leader portion of the film strip F is wound onto and around the spool assembly as will become clear from the subsequent description.

Figure 3:
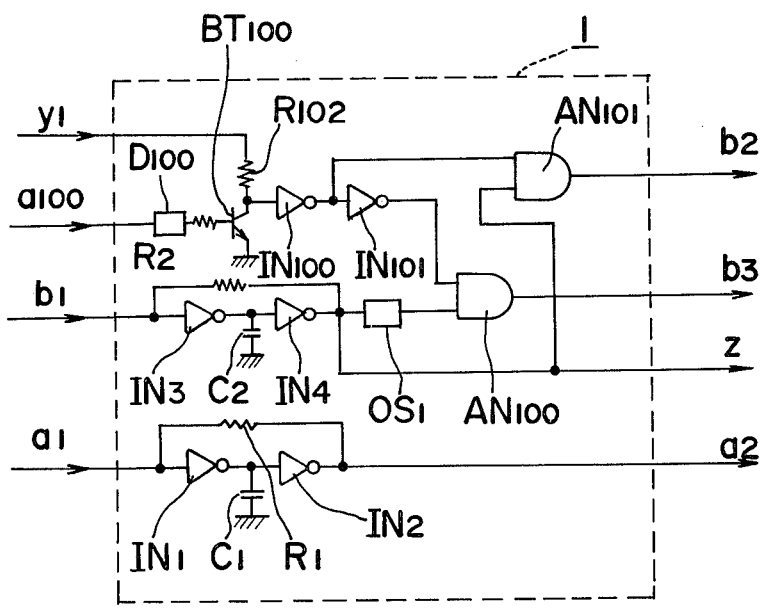
FIG. 3 is a circuit diagram showing the details of a first control circuit shown in FIG. 1.
Figure 4:
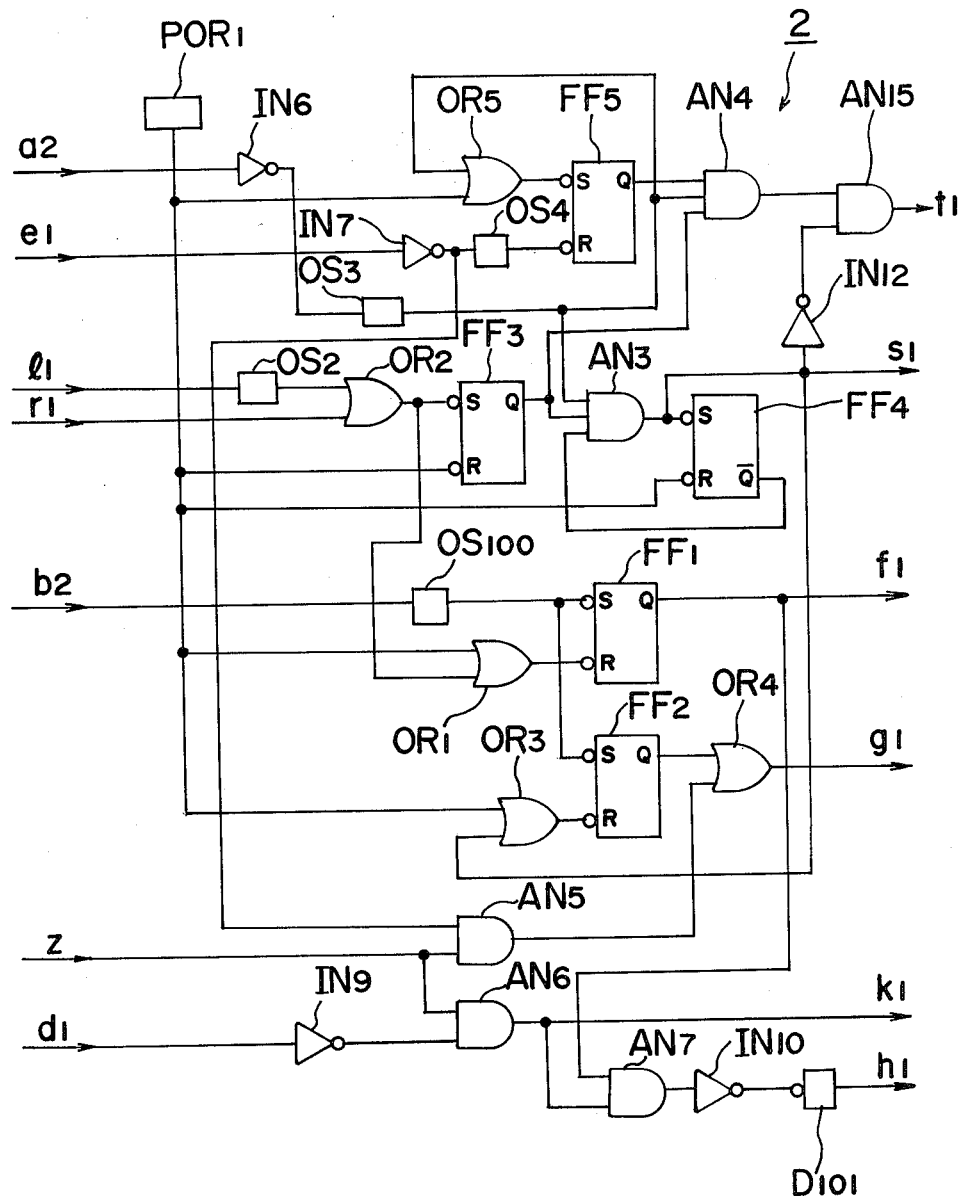
FIG. 4 is a circuit diagram showing the details of a second control circuit shown in FIG. 1.

The circuit shown in FIG. 1 comprises a first control circuit 1, the details of which are shown in FIG. 3; an electromagnet $Mg_1$ having its core in the form of a permanent magnet and adapted to attract a film wind-up refraining mechanism, as will be described later, in response to the closure of a camera back lid for disabling the film wind-up operation; a power supply control switch SW2 adapted to be closed in response to the closure of the camera back lid for connecting power supply lines $x_1$ and $y_1$ together; a normally opened switch SW3 adapted to be closed only when a film wind-up lever for driving a film wind-up system is manually operated, the details of a mechanism thereof being described later; a switch SW4 operatively associated with a manipulatable button (hereinafter referred to as "R button") which is generally manipulated when the film strip F is to be rewound or when multiple exposures are desired during the actual taking of a photograph; a second control circuit 2, the details of which are shown in FIG. 4; an electromagnet $Mg_2$ for attracting a film wind-up refraining lever, as will be described later, so that, even though no operation of an exposure control mechanism take place, the film wind-up operation (hereinafter referred as a preparatory film wind-up) can be effected; a warning circuit 3 for giving an audible or a visual signal during the preparatory film wind-up; and a switch SW5 which is opened when no audible or visual signal to be given by the warning circuit 3 is desired or necessary.

Figure 5:
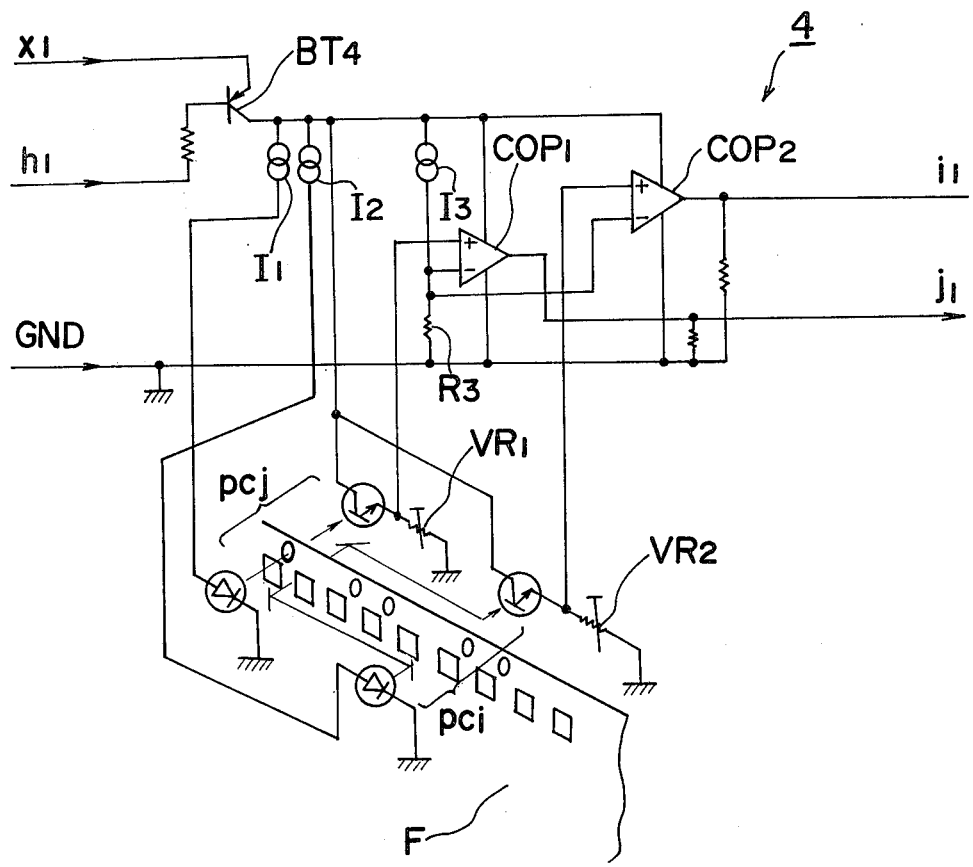
FIG. 5 is a circuit diagram showing the details of an information detector circuit shown in FIG. 1.
Figure 7:
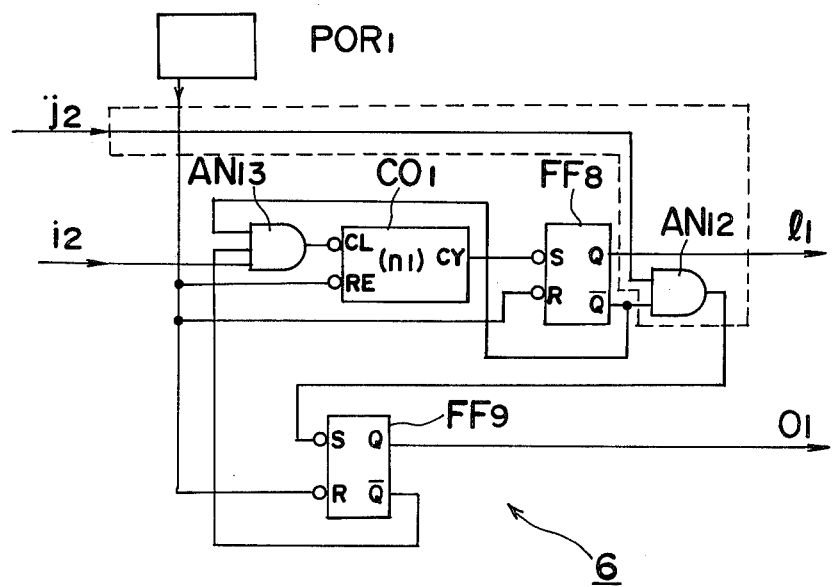
FIG. 7 is a circuit diagram showing the details of a signal discriminator circuit shown in FIG. 1.
Figure 6A:
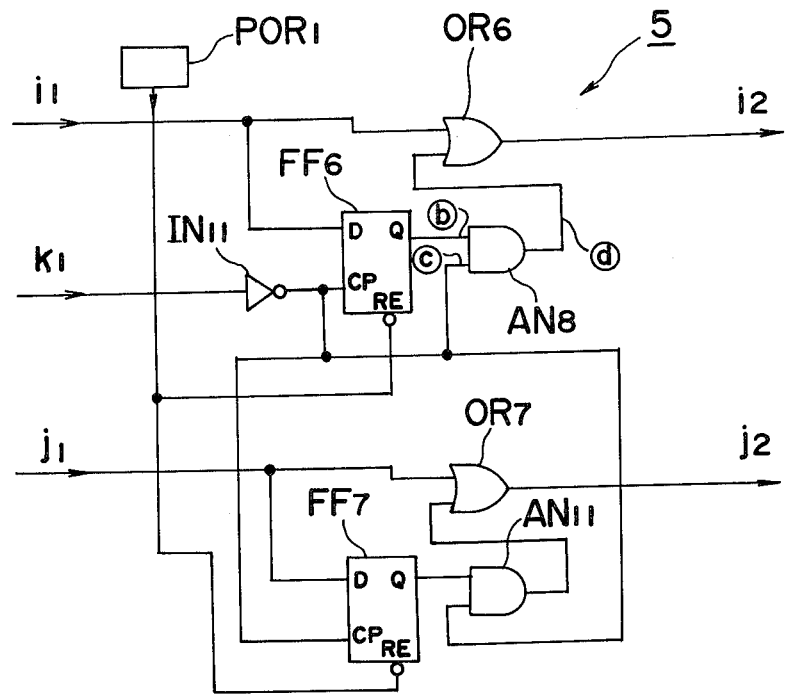
FIG. 6(a) is a circuit diagram showing the details of a signal retention circuit shown in FIG. 1.

The circuit shown in FIG. 1 also comprises an information detector 4 for generating output signals based on the information given from the code region H on the film strip F as well as that from the sprocket holes PH, the details of which are shown in FIG. 5; a signal retention circuit 5 for storing the output signals from the information detector 4 when the operation of the film wind-up lever is interrupted, the details of which are shown in FIG. 6(a); a discriminator 6 for discriminating whether or not the film strip used is of a type having the code region H with some code perforations therein, the details of which are shown in FIG. 7; a memory circuit 7 operable in response to output signals from the signal retention circuit 5 for reading out the information contained in the code region H and storing it; a frame counter 8 for counting the number of the film frames which have been exposed; a data selector circuit 9 for selectively outputting two output signals from the frame counter 8 one at a time depending whether or not the film strip F used is of the type having the code region H; a decoder 10 for converting the data fed from the data selector 18 into data ready to be displayed; a frame number display circuit 11 for displaying the number of the film frames exposed in response to the data from the decoder 10; and an auto setting display circuit 18 for displaying that the information contained in the code region H has been read out.

The circuit shown in FIG. 1 further comprises a light measuring switch SW6; a release switch SW7; a shutter release circuit 12; an exposure control circuit 13 for effecting an exposure control on the basis of data fed from a light measuring, arithmetic and display circuit LM; a manipulatable film speed setting unit 14; a data selector 15 operable in response to an output signal from the discriminator 6 for selecting a film speed data from the memory circuit 7 and a film speed data from the setting unit one at a time when the film strip F used is of a type having the code region H and when it is of a type having no code region, respectively; a decoder 16 for converting the data from the data selector 15 into data ready to be displayed; a film speed display circuit 17 for displaying the film speed of the film strip used; and a switch SW8 adapted to be closed in operative association with a display button, provided separately of the light measuring switch SW6, this switch SW6 being closed, when the film speed set manually or read out is desired to be confirmed. The light measuring, arithmetic and display circuit LM is so designed as to perform an arithmetic process in the light of the film speed, the output indicative of the measured amount of light and a preset exposure control value and to apply an output indicative of the result of the arithmetic process to the exposure control circuit 13 for the automated exposure control.

It is to be noted that the light measuring switch SW6 and the release switch SW7 are adapted to be closed in response to first and second stages of depression of a shutter release button in a manner well known to those skilled in the art.

It is also to be noted that reference character E1 represents a battery providing a source of electrical power for the camera. Reference character $C_{100}$ represents a capacitor which serves as a back-up power source for retaining the stored contents in the memory circuit 7 during the replacement of the battery E1. Reference character $DI_{100}$ represents a diode for protecting the circuit which would be adversely affected when the battery E1 is connected in the wrong way.

The circuit shown in FIG. 1 also includes NPN-type transistors $BT_1$, $BT_2$, $BT_3$, $BT_8$, $BT_9$ and $BT_{10}$ and PNP-type transistors $BT_4$, $BT_5$, $BT_6$ and $BT_7$, the function of each of which will become clear from the subsequent description. It is, however, to be noted that each connecting line having a slant line represents a multiple parallel bit line through which a binary coded signal flows. It is also to be noted that the term "terminal" hereinafter frequently used is intended to mean not only a physical terminal, such as a point to which electrical connections can be made, or an input or output point of a particular circuit component, but also both a physical conductor connecting one circuit component to another and an electrical signal carried by such physical conductor or appearing at such physical terminal.

Hereinafter, the operation of the camera circuit shown in FIG. 1 will be described.

In the first place, it is assumed that, while the film has not yet been loaded in the camera, the camera back lid is opened. In this condition, all of the spool switches SWS1, SWS2 and SWS3 are closed and, accordingly, a terminal $b_1$ is in a low level state. On the other hand, when the switch SW1 is closed in response to the completion of the shutter charging operation, a terminal $a_1$ is held in a low level state and, accordingly, an output from a wave shaping circuit shown in FIG. 3 as comprised of inverters $IN_1$ and $IN_2$, a capacitor $C_1$ and a resistor $R_1$ is in a low level state, thereby bringing the transistor $BT_5$ in a condition ready to conduct. Subsequent closure of the light measuring switch SW6 results in closure of the transistor $BT_7$ and, therefore, not only is the film speed displayed by the disply unit 17 on the basis of the data from the manipulatable film speed setting unit 14, but also the light measuring, arithmetic and display unit LM undergoes an arithmetic and display process based on the preset film speed. When the release switch SW7 is finally closed, the transistors $BT_5$ and $BT_6$ conduct to allow the release circuit 12 to release a known exposure control mechanism thereby initiating an exposure control operation. At the same time, the transistors $BT_8$ and $BT_9$ are brought into a conducting state to establish self-energized circuits to maintain the supply of an electrical power with the consequence that the exposure control is carried out by the exposure control circuit 13. Upon completion of the exposure control, the switch SW1 is opened and the terminals $a_1$ and $b_1$ are consequently opened to bring the transistor $BT_5$ into a non-conducting state, thereby completing the exposure control operation. It is to be noted that, under this condition in which the camera back lid is opened, the switch SW2 is opened and, therefore, no supply of the electrical power from a power supply line $x_1$ is effected.

In the next place, it is assumed that, while the film is not loaded in the camera, the camera back lid is closed. When and so long as the camera back lid is closed, a film wind-up refraining mechanism is attracted by the electromagnet $Mg_1$ in readiness for a film wind-up operation and, at the same time, the switch SW2 is closed to effect the power supply from the power supply line $x_1$. Since no film is loaded, all of the spool switches SWS1, SWS2 and SWS3 are closed and the terminal $b_1$ is consequently held in a low level state. This in turn results in that respective outputs from an inverter $IN_4$ and AND gates $AN_{100}$ and $AN_{101}$ shown in FIG. 3 are all in a low level state and, consequently, terminals $b_2$, $b_3$ and z are held in a low level state. In addition, at the time the switch SW2 is closed in response to the closure of the camera back lid, flip-flops $FF_1$, $FF_2$, $FF_3$ and $FF_4$ and a flip-flop $FF_5$ as shown in FIG. 4 are reset and set, respectively, by a pulse fed from a power-on reset circuit $POR_1$.

When the terminal $a_1$ of the first control circuit 1 is brought into a low level state subsequent to the closure of the switch SW1 in response to the completion of the shutter charging operation, the transistor $BT_5$ is brought into a conductive state. On the other hand, in response to change of the terminal $a_2$ from a high level state to a low level state, an output from an inverter $IN_6$ shown in FIG. 4 is brought into a high level state, and a one-shot multivibrator circuit (hereinafter referred to as "one-shot circuit") $OS_3$ generates a high level output. Although this high level output from the one-shot circuit $OS_3$ is applied to both of AND gates $AN_3$ and $AN_4$ shown in FIG. 4, it does not pass therethrough because they are disabled. However, when the light measuring switch SW6 and the release switch SW7 are successively closed in a manner similar to that previously described, the exposure control is carried out on the basis of the manually preset film speed and the switch SW1 is subsequently closed, rendering the terminal $a_2$ in a high level state. Even though the terminal $a_2$ is brought into the high level state in this way, no change occur in the output from a second control circuit 2. In this condition, since the electromagnet $Mg_2$, the function of which will be described later, remains deenergized, the film wind-up is barred immediately after the film strip has been moved a distance corresponding to one film frame, and the film wind-up is therefore stopped and the shutter charging completes. It is after the switch SW1 has again been closed that the next succeeding preparatory film wind-up can be effected. It is, however, to be noted that, though during the film wind-up the switch SW3 is closed with a terminal $d_1$ consequently held in a low level state, an output $k_1$ from an AND gate $AN_6$ shown in FIG. 4 remains in a low level state because the terminal z is in a low level state. Moreover, as will be described with reference to FIGS. 5, 6, 7 and 9, a terminal $h_1$ remains in a high level state with the transistor $BT_4$ consequently held in a non-conducting state, and therefore, output terminals $i_1$ and $j_1$ of the detector 4 are in a low level state while an output terminal $r_1$ of the memory circuit 7 are both in a low level state. Under this condition, these terminals will bring no effect on the second control circuit shown in details in FIG. 4.

The operation of the camera circuit which takes place when the film having the code region such as shown in FIG. 2 or any other commercially available film with no code region is loaded will now be described.

Assuming that the film loaded in the camera is wound up while the camera back lid is left open, the leader portion of the film is wound around the take-up spool assembly with all of the spool switches SWS1, SWS2 and SWS3 consequently opened, thereby rendering the terminal $b_1$ to be in a high level state which in turn results in the generation of a high level pulse from a one-shot circuit $OS_1$ in FIG. 4. At this time, since the camera back lid has not yet been closed, a terminal $a_{100}$ is in a low level state and, consequently, a transistor $BT_{100}$ shown in FIG. 3 is in a non-conducting state. During this condition, an inverter $IN_{101}$ generates a high level signal which is applied to an AND gate $AN_{100}$ to allow the passage of the output pulse from the one-shot circuit $OS_1$ therethrough to the base of the transistor $BT_1$ to bring the latter into a conducting state. Upon conduction of the transistor $BT_1$, the electromagnet $Mg_1$ conducts to release the film wind-up refraining mechanism which has been attracted thereby, whereby the film wind-up to be performed while the camera back lid is opened can be barred. Accordingly, the film wind-up is stopped in a condition in which the film has been sufficiently wound around the take-up spool assembly. By so doing, the problem which would arise when, in the case where the film having the code region H is used, the code region H has moved past the detecting station without coded information on the code region H being read out while the camera back lid is left open can advantageously be substantially eliminated and, also, any possible waste of the film due to unnecessary exposure to the ambient light can substantially be eliminated. In addition, the fact that the film wind-up has been barred provides an indication that the film has with no fault been loaded in the camera. This can be accomplished either by allowing a pin-like member to project into one of the sprocket holes PH to disable the movement of the film or by decoupling a transmission clutch used for transmission to a film wind-up system. Specifically, the latter method is to be understood as including both of the arrangement wherein a film wind-up lever is barred from its movement and the arrangement wherein, even though the film wind-up lever can be moved, the film will not move. The details thereof will become apparent from the description to be made later in connection with a film wind-up mechanism.

When the camera back lid is subsequently closed, the film wind-up refraining mechanism is attracted by the electromagnet $Mg_1$, thereby rendering the film wind-up to be possible again and, when the switch SW2 is closed in response to the closure of the camera back lid, the second control circuit 2, the details of which are shown in FIG. 4, starts its operation with the flip-flops $FF_1$ to $FF_4$ and the flip-flop $FF_5$ being consequently reset and set, respectively, in the manner as hereinbefore described. Also, the terminal $a_{100}$ is brought into a high level state and, after the power-on reset circuit $POR_1$ has ceased generating the output pulse, a transistor $BT_{100}$ shown in FIG. 3 is brought into a conducting state by the operation of a delay circuit $D_{100}$ and, consequently, the output from an inverter $IN_{100}$ is held in a high level state. On the other hand, since the terminal z is in the high level state, an output $b_2$ from the AND gate $AN_{101}$ is in a high level state, causing a one-shot circuit $OS_{100}$ to generate a high level pulse with which the flip-flops $FF_1$ and $FF_2$ are set with terminals $f_1$ and $g_1$ consequently held in a high level state. Thereby, the transistor $BT_2$ is caused to conduct to render the electromagnet $Mg_2$ to be conducting so as to attract the film wind-up refraining mechanism. As will be described later with reference to FIG. 13, the switch SW1 is opened when the film wind-up refraining mechanism is so attracted by the electromagnet $Mg_2$, thereby disabling the exposure control. Thus, when the film wind-up refraining mechanism is so attracted, no further exposure control operation take place, but the preparatory film wind-up operation can be carried out.

In the event that the camera back lid is closed prior to the closure of all of the spool switches SWS1, SWS2 and SWS3, the camera circuit operates as follows. That is, although at the time of closure of the camera back lid the terminal $a_{100}$ is brought into a high level state and, after a predetermined time determined by the delay circuit $D_{100}$, the outputs from the inverters $IN_{100}$ and $IN_{101}$ are held in high and low level states, respectively, the outputs at the terminals $b_2$ and $b_3$ do not vary because the output at the terminal $b_1$ is in a low level state. When the terminal $b_1$ is subsequently brought into a high level state as a result of the film wind-up, the one-shot circuit $OS_1$ shown in FIG. 3 generates a high level pulse. However, since the output from the inverter $IN_{101}$ is in a low level state, the electromagnet $Mg_1$ does not conduct and, therefore, no film wind-up is refrained. The film wind-up is continuously performed. Simultaneously therewith, the AND gate $AN_{101}$ generates its output $b_2$ which is in a high level state, and accordingly, the flip-flops $FF_1$ and $FF_2$ are set, thereby establishing a condition similar to the condition which is established when, after the film has usually been loaded, the camera back lid is closed.

With regards to the warning circuit 3, since the terminal $g_1$ is connected to the transistor $BT_3$, during the preparatory film winding operation in which the film strip is wound on the take-up spool assembly until the initial film frame is brought into register with the exposure station subsequent to the closure of the camera back lid, this warning circuit 3 gives a warning, such as by means of a buzzer and/or a light emitting diode, to show that the preparatory film winding is being performed. Unless any warning given by the warning circuit 3 is desired, the manipulatable switch SW5 is manually opened to render the warning circuit 3 inoperative. The timing at which the terminal $g_1$ is brought into the high level state will be described later.

The operation of the camera circuit during the preparatory film wind-up will now be described. During the preparatory film wind-up being performed, the flip-flops $FF_1$ and $FF_2$ are set and an AND gate $AN_7$ is enabled. An AND gate $AN_6$ is also enabled because the film has been loaded and the terminal z has consequently held in a high level state. When the switch SW3 is closed as a result of the execution of the film wind-up, respective outputs from an inverter $IN_9$ and the AND gates $AN_6$ and $AN_7$ are in a high level state while an output from an inverter $IN_{10}$ is in a low level state. Consequently, the terminal $k_1$ is in a high level state and the terminal $h_1$ is in a low level state through a delay circuit $D_{101}$. When the terminal $h_1$ is so held in the low level state, the transistor $BT_4$ conducts to effect the electrical power supply to the information detector 4 shown in details in FIG. 5. The delay circuit $D_{101}$ is such as to delay a predetermined time the set-up of the input to a high level state, but as to generate the set-down of the input without being delayed. In FIG. 5, reference character PCi represents a photo-coupler for the detection of the passage of sprocket holes and reference character PCj represents a photo-coupler for the detection of the coded information on the code region H, that is, the passage of code perforations on the code region, of the film strip F. In order for a light-emitting diode for each photo-coupler PCi or PCj to emit a stable beam of light, this light-emitting diode is driven by a respective constant current source $I_1$ or $I_2$ as shown in FIG. 5. When the potential at the junction between each photo-transistor for the corresponding photo-coupler PCi or PCj and an associated variable resistor $VR_1$ or $VR_2$ for the adjustment becomes higher than that at the junction between a constant current source $I_3$ and a resistor $R_3$, an associated comparator $COP_1$ or $COP_2$ generates from its output terminal $i_1$ or $j_1$ a high level signal signifying the presence of the code perforation or sprocket hole. It is to be noted that the high level signal from the comparator $COP_2$ signifying the presence of the sprocket hole is utilized for the purpose of synchronization.

When the preparatory film wind-up is performed, the information detector 4 shown in details in FIG. 5 generates respective signals indicative of the passage of the code perforations and the sprocket holes as the film is moved, which signals appear at the respective terminals $i_1$ and $j_1$. These signals from the terminals $i_1$ and $j_1$ are in turn fed to the signal retention circuit 5 shown in details in FIG. 6.

This signal retention circuit 5 is provided for as a countermeasure associated with the manual film wind-up capability. In other words, it often occurs that, during the manual film wind-up operation to bring the initial film frame into register with the exposure station, the movement of the film is interrupted by or for some reason, leaving the camera aside with the initial film frame out of alignment with the exposure station. Since the information detector 4 is the major circuit component which consumes a relatively large amount of the electrical power, the electrical power supply to such detector 4 is automatically interrupted for the purpose of energy saving when the film wind-up is interrupted. If this signal retention circuit 5 is not utilized, the high level outputs at the respective terminals $i_1$ and $j_1$ will reverse to low level states at the time of interruption of the electrical power supply, resulting in that one or both of a circuit for reading out information on the code region of the film and a circuit for counting the number of the sprocket holes passed will operate erroneously. In order to avoid such a problem as hereinabove described, the signal retention circuit 5 is utilized for memorizing the respective states which the outputs at the terminals $i_1$ and $j_1$ assume at the time of interruption of the film wind-up.

Figure 6B:
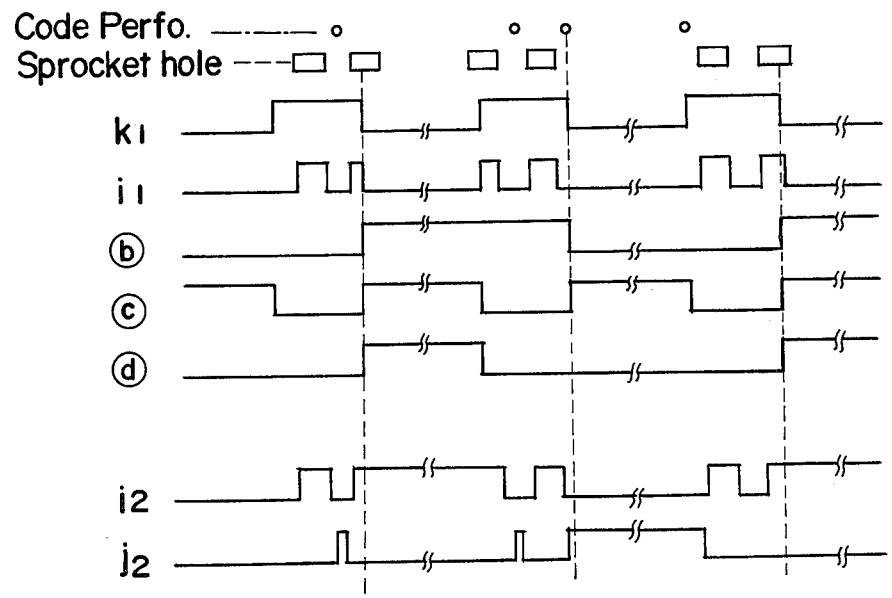
FIG. 6(b) is a diagram showing waveforms of various signals appearing in the circuit shown in FIG. 6(a)

Referring now to FIG. 6 wherein FIG. 6(a) shows the details of the signal retention circuit 5 and FIG. 6(b) shows the relationship between the code perforations and sprocket holes and the various signals appearing in the circuit 5, D-type flip-flops $FF_6$ and $FF_7$ are reset by the power-on reset circuit $POR_1$ when the switch SW2 is closed in response to the closure of the camera back lid. The terminal $k_1$ which has been in the high level state reverses to a low level state when the wind-up of the film loaded in the camera is brought to a halt and the switch SW3 is consequently closed as shown in FIGS. 1 and 4. On the other hand, because of the employment of the delay circuit $D_{101}$, the low level state at the terminal $h_1$ reverses to a high level state after the predetermined time. In response to change in state of the terminal $k_1$ from the high level state to the low level state, a low level output of an inverter $IN_{11}$ is brought into a high level state and, accordingly the D-type flip-flops $FF_6$ and $FF_7$ memorize the signals then appearing at the respective terminals $i_1$ and $j_1$ which are subsequently outputed from respective Q outputs of the flip-flops $FF_6$ and $FF_7$. The delay time of the delay circuit $D_{101}$ is so selected that, after a period of time required for the signals at the respective terminals $i_1$ and $j_1$ to be outputed from the respective Q outputs of the flip-flops $FF_6$ and $FF_7$ subsequent to the reversal in state of the output from the inverter $IN_{11}$, the output $h_1$ from the delay circuit $D_{101}$ can be brought into a high level state. Accordingly, the interruption of the electrical power supply caused by the transistor $BT_4$ takes place after the signals at the terminals $i_1$ and $j_1$ have been latched in the flip-flops $FF_6$ and $FF_7$, respectively.

During the performance of the film wind-up, the respective signals from the terminals $i_1$ and $j_1$ are outputed from associated OR gates $OR_6$ and $OR_7$. However, during the interruption of the film wind-up, the respective outputs from the terminals $i_1$ and $j_1$ which appear immediately before the film wind-up is interrupted are outputed from the associated OR gates $OR_6$ and $OR_7$ through AND gates $AN_8$ and $AN_{11}$ because the output from the inverter $IN_{11}$ is in a high level state. Accordingly, even when the high level states of the terminals $i_1$ and $j_1$ change to low level states as a result of the interruption of the electrical power supply to the information detector and the low level states of the terminals $i_1$ and $j_1$ subsequently comes to assume the high level states again as a result of the subsequent supply of the electrical power supply to the information detector, terminals $i_2$ and $j_2$ remain in a high level state and, therefore, there will arise no erroneous operation in counting the amount of read-out and that of feed.

Signals on the terminals $i_2$ and $j_2$ of the signal retention circuit 5 are then fed to the discriminator 6 which serves to detect whether or not the film loaded and being wound up is of a type having the coded information on the code region. The details of this circuit 6 are shown in FIG. 7.

Referring to FIG. 7, when the electrical power supply is initiated through the switch SW2 in response to the closure of the camera back lid, a counter $CO_1$ and flip-flops $FF_8$ and $FF_9$ are reset by a signal from the power-on reset circuit $POR_1$. The counter $CO_1$ is comprised of a modulo $n_1$ counter capable of generating from its carry terminal CY an output signal indicative of the $n_1$-th count. It is to be noted that the value $n_1$ is a number greater than the number of the sprocket holes starting from the first sprocket hole and ending at the sprocket hole immediately followed by the perforation in the code area IH shown in FIG. 2.

In the case with the film of the type having the code region, before a train of pulses indicative of the passage of $n_1$ sprocket holes is fed to the counter $CO_1$ through the terminal $i_2$, a pulse signifying the passage of the code perforation in the coded area IH is supplied through the terminal $j_2$ and then through an AND gate $AN_{12}$ to a flip-flop $FF_9$ to set the latter. When the flip-flop $FF_9$ is so set, the terminal $o_1$ is brought into a high level state and, at the same time, an AND gate $AN_{13}$ is disabled, thereby blocking the pulses from being fed therethrough to the counter $CO_1$. By so doing, a flip-flop $FF_8$ remains in a reset state with the terminal $1_1$ held in a low level state.

On the other hand, in the case with the film of the type having no code region, when the $n_1$ pulses are fed to the counter $CO_1$, the counter $CO_1$ generates from its carry terminal CY the output pulse corresponding to the $n_1$-th pulse with which the flip-flop $FF_8$ is set with the terminal $1_1$ consequently rendered in a high level state and, at the same time, with the AND gates $AN_{12}$ and $AN_{13}$ consequently disabled and, therefore, the terminal $o_1$ remains in the low level state.

In the case with the film of the type having the code region, when the transistor $BT_{10}$ as a result of the high level state at the terminal $o_1$, the fact that the number of film frames exposed, the film speed and others are based on the automatically preset data is indicated by the display unit 18 and the selector circuit 15 is rendered ready to output data representative of the film speed fed from the memory circuit 67 and also to output an output data $u_1$ included in the output data from the frame counter.

Referring again to FIGS. 1 and 4, in the case with the film of the type having the code region, when the terminal $1_1$ is brought into a high level state, a high level output is generated from the one-shot circuit $OS_2$ shown in FIG. 4, which is in turn fed through the OR gate $OR_2$ to the flip-flop $FF_3$ to set the latter and, also, through the OR gate $OR_1$ to the flip-flop $FF_1$ to reset the latter. When the flip-flop $FF_3$ is so set, the AND gates $AN_3$ and $An_4$ are enabled. In addition, when the terminal $f_1$ is rendered in a high level state, the AND gate $AN_7$ generates a low level signal which is subsequently converted into a high level signal by the inverter $IN_{10}$ and, accordingly, after the predetermined time determined by the delay circuit $D_{101}$, the terminal $h_1$ is brought into a high level state. This high level signal from the terminal $h_1$ is in turn applied to the transistor $BT_4$ to bring the latter into a non-conducting state thereby to interrupt the supply of the electrical power to the circuit for detecting the passage of openings on the film. On the other hand, when the terminal $f_1$ is so brought into the low level state, the transistor $BT_2$ and, then, the electromagnet $Mg_2$ are brought into a non-conducting state, thereby releasing a film wind-up refraining lever. When the film wind-up is subsequently rendered ready to complete, the film wind-up is barred by the refraining lever with the camera consequently rendered ready for use in actual taking of a photograph.

In the case of the preparatory winding of the film of the type having the code region, based on the signals generated from the respective terminals $i_2$ and $j_2$ of the signal retention circuit 5 as the film moves, which signals are indicative of the passage of the sprocket holes and the code perforations, respectively, the memory circuit 7 reads out data coded on the code region of the film strip and, after completion of the data read-out, generates from a terminal $r_1$ a pulse indicative of the presence of the code perforation on the coded area EH. Moreover, the memory circuit 7 generates from its terminal $p_1$ and $q_1$ output signals indicative of the number of film frames exposed and of the film speed, respectively. Since the details of this circuit 7 are disclosed in the Japanese Patent applications No. 55-141302, No. 55-141303 and No. 55-152579 filed by the same assignee of the present invention, the description thereof is herein omitted for the sake of brevity and reference may be had thereto.

When the signal from the terminal $r_1$ is fed to the second control circuit 2 shown in FIG. 2, as is the case when the terminal $1_1$ is rendered in a high level state, the flip-flops $FF_1$ and $FF_3$ are set and the terminal $f_1$ is brought into a low level state. Therefore, the electromagnet $Mg_2$ is rendered non-conducting and, consequently, the film wind-up is rendered ready to be barred. Upon subsequent completion of the film wind-up, the film wind-up is barred with the switch SW1 closed to bring the terminal $a_2$ into a low level state. As a result thereof, the pulse from the one-shot circuit $OS_3$ is generated from a terminal $s_1$, which pulse is in turn fed to the frame counter 8 to preset the frame number data fed from the data terminal $p_1$ of the memory circuit 7.

It is to be noted that, although at the time when the initial film frame is held at the exposure station in readiness for the actual taking of a photograph, the pulse from the one-shot circuit $OS_3$ emerges simultaneously from the AND gates $AN_3$ and $AN_4$, an AND gate $AN_{15}$ is disabled by an inverter $IN_{12}$ during the period in which the terminal $s_1$ is in a high level state and, therefore, this pulse is not outputed to the terminal $t_1$. Then, the flip-flops $FF_2$ and $FF_4$ are reset by the pulse from the terminal $s_1$ and this condition remains until the film is replaced.

By the operation as hereinbefore described, the initial film frame of the film can be used for the actual taking of a photograph and, as hereinbefore described, subsequent depression of the release button initiates the exposure control operation. Upon completion of the exposure control operation, the switch SW1 is opened, but is again closed at the time of completion of the film wind-up. When this switch SW1 is so closed, the terminal $A_2$ is brought into a low level state and the pulse from the one-shot circuit $OS_3$ is outputed through the AND gates $AN_4$ and $AN_{15}$ to the terminal $t_1$. On the other hand, since the flip-flop $FF_4$ is set at the time the pulse emerges from the terminal $s_1$, the AND gate $AN_3$ is disabled and, therefore, any further pulse no longer come from the terminal $s_1$ until the film is replaced. The pulse from the terminal $t_1$ is fed to the counter 8 and, in the case with the film of the type having the code region, the value from the data terminal $u_1$, which is equal to the preset number of film frames subtracted by one, is fed to the display unit 11 through the selector 9 and, then, the decoder 10 to effect the display of the number of film frames left unexposed, but in the case with the film of the type having no code region, the value from the data terminal $v_1$, which is equal to the preset number of the film frames added by one, is fed to the display unit 11 through the selector 9 and, then, the decoder 10 to effect the display of the number of film frames exposed.

Hereinafter, the operation which will take place when a multiple exposure photography is desired will be described. As hereinbefore described, the switch SW4 is the one which is closed in response to the manipulation of the R button which is used when the film is desired to be rewound or when the multiple exposures are desired to be effected on one and the same film frame. When this switch SW4 is closed, the inverter $IN_7$ shown in FIG. 4 generates a high level signal, in response to which the one-shot circuit $OS_3$ generates a pulse with which the flip-flop $FF_5$ is set. On the other hand, since the terminal z is in a high level state in view of the film loaded in the camera, a high level signal emerges from the AND gate $AN_5$ and, then, from the OR gate $OR_4$ and, therefore, the terminal $g_1$ is in a high level state. Because of the terminal $g_1$ in the high level state, the transistor $BT_3$ conducts to cause the warning circuit 3 to provide an indication that the camera is set in a condition ready to effect a multiple exposure photography. In this condition, even though the film wind-up is performed, the film will not be advanced, but only the shutter charge can be effected. When the switch SW1 is subsequently closed upon completion of the shutter charge, the one-shot circuit $OS_3$ generates a high level pulse. However, since the flip-flop $FF_5$ is reset at this time, no pulse emerges from the terminal $t_1$ and the frame counter does not perform its counting operation. On the other hand, the pulse from the one-shot circuit $OS_3$ is fed through the OR gate $OR_5$ to a set terminal of the flip-flop $FF_5$ to set the latter again, resulting in that the AND gate $AN_4$ is enabled. In addition, the R button automatically return in response to the completion of the wind-up and the switch SW4 is then opened to cause the terminal $g_1$ to be in a low level state, resulting in that the warning circuit 3 is rendered inoperative.

The film rewinding operation will now be described. Although the film rewinding is a procedure generally carried out when and after the total number of available film frames has been used, i.e., exposed, it often occurs that the film once removed out of the camera with some of the available film frames left unexposed is again loaded and used in the camera at a different occasion. The following is particularly advantageous in the latter case. The first procedure is to close the R button as is the case with the multiple exposure photography. When this is done, all of the spool switches SWS1, SWS2 and SWS3 are opened and the terminal z is in a high level. In addition, since the inverter $IN_7$ generates a high level signal because of the closure of the R button, a high level output emerges from the AND gate $AN_5$ and, then, from the OR gate $OR_4$, thereby causing the warning circuit 3 to give a warning. When at least one of the spool switches SWS1, SWS2 and SWS3 is closed as a result of the film rewinding, the terminal z is brought into a low level state, whereby the warning circuit 3 is rendered inoperative. The photographer should stop the film rewinding immediately after he or she has ascertained that the warning circuit 3 has ceased its warning function. By so doing, it is possible to avoid any inconvenience that the leader portion of the film strip being rewound will be rewound completely into the cartridge or magazine, and therefore, the film removed from the camera in the form with the leader portion exposed outside the cartridge or magazine can readily be loaded in the camera at a different occasion. Even in the case where the total number of the available film frames has been used, the removal of the film in the manner described above is advantageous in that there is no possibility of external light entering the cartridge or magazine through the slit in the cartridge or magazine. As is well known, once the external light enters the cartridge or magazine through the slit through which the film is drawn out of and withdrawn into the cartridge or magazine,s the film inside the cartridge or magazine will not be inadvertently exposed. This possibility can advantageously be avoided according to the present invention.

Figure 8:
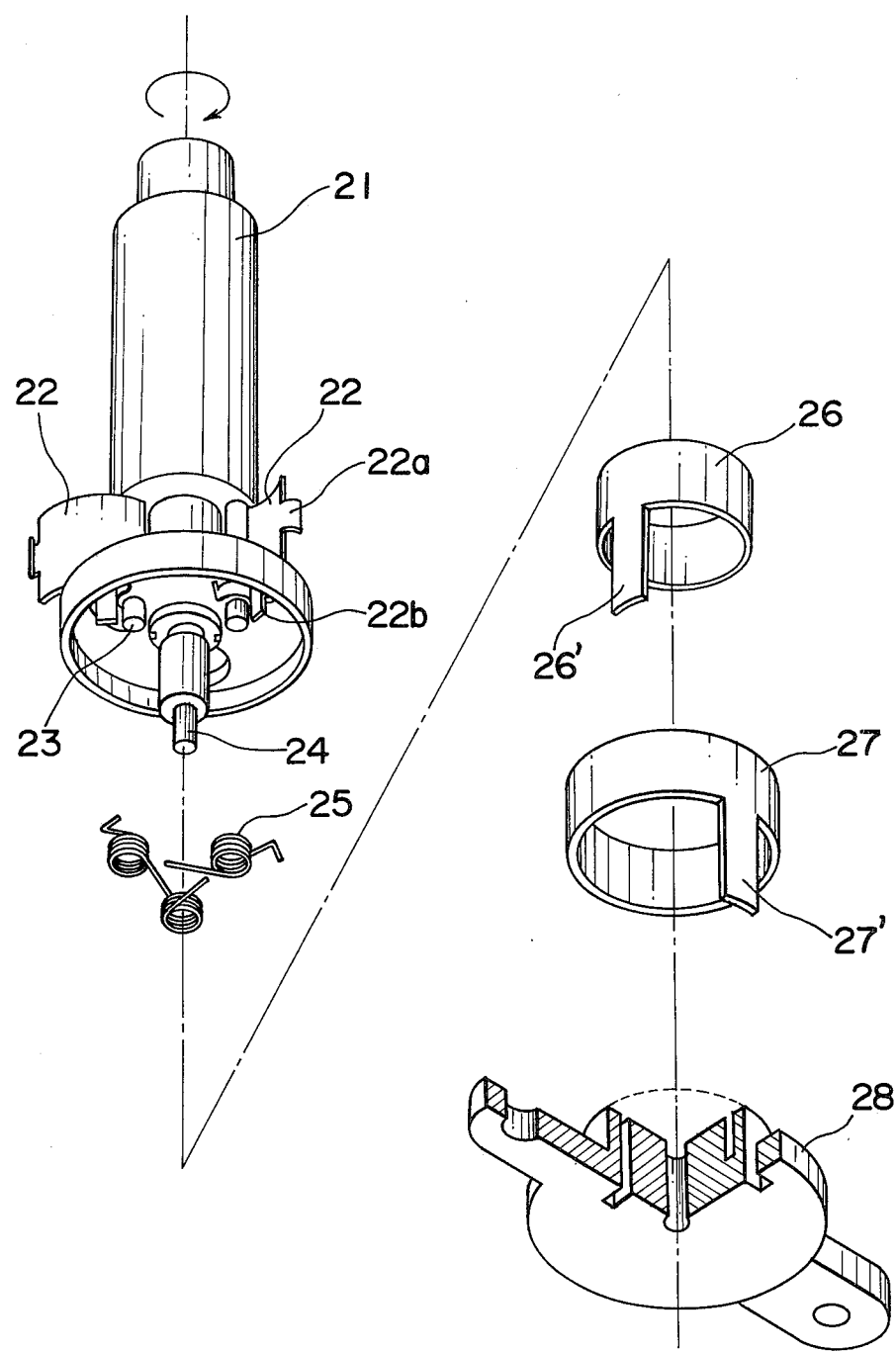
FIG. 8 is an exploded view of a film take-up spool assembly used in the camera according to the present invention.
Figure 9:
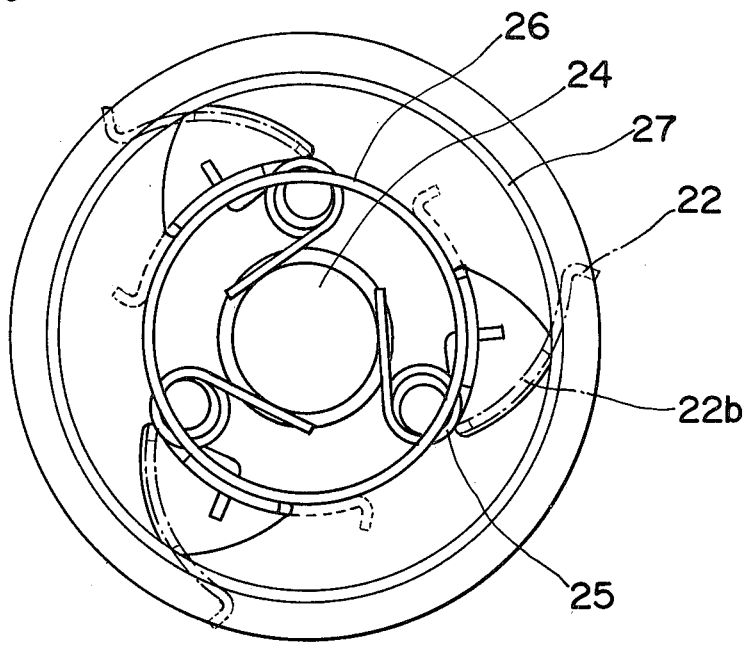
FIG. 9 is a bottom plan view of the film take-up spool assembly shown in FIG. 8.

Referring now to FIGS. 8 and 9 which illustrates how the spool switches SWS1, SWS2 and SWS3 are built in the take-up spool assembly in the camera, reference numeral 21 represents a generally cylindrical spool operatively associated with the film wind-up mechanism (not shown in FIGS. 8 and 9) and rotatable about its longitudinal axis in a direction shown by the arrow. Three identical reference numerals 22 represent respective spool flaps made of an electroconductive material and pivotally supported at a lower end portion of the spool 21 for movement between closed and opened positions, shown by the solid and chain lines, respectively, in FIG. 9, in a direction generally radially of the spool 21.

Reference numeral 22a represents a pawl formed at the tip of each spool flap 22 and engageable in each of the sprocket holes in the film strip. Reference numeral 23 represents a boss for the support of a respective torsion spring 25 which is used to urge the associated spool flap 22 to normally assume the opened position as shown by the solid line in FIG. 9. Reference numeral 24 represents a terminal member coaxially outwardly protruding from the spool 21, and reference numerals 26 and 27 represent terminal rings having respective tongues 26' and 27' and fixed on a guide member 28. It is to be noted that the terminal ring 26 is utilized only for rendering the spool switch SWS to have a multi-function and may not be always necessary. It is also to be noted that in the foregoing description of the camera circuit particularly shown in FIG. 1 reference has been made to the spool assembly having only the terminal ring 27. The terminal members 24, 26 and 27 shown in FIGS. 8 and 9 correspond to terminals GND, $\bar{z}$ and $b_1$, respectively, shown in FIG. 10.

Figure 10:
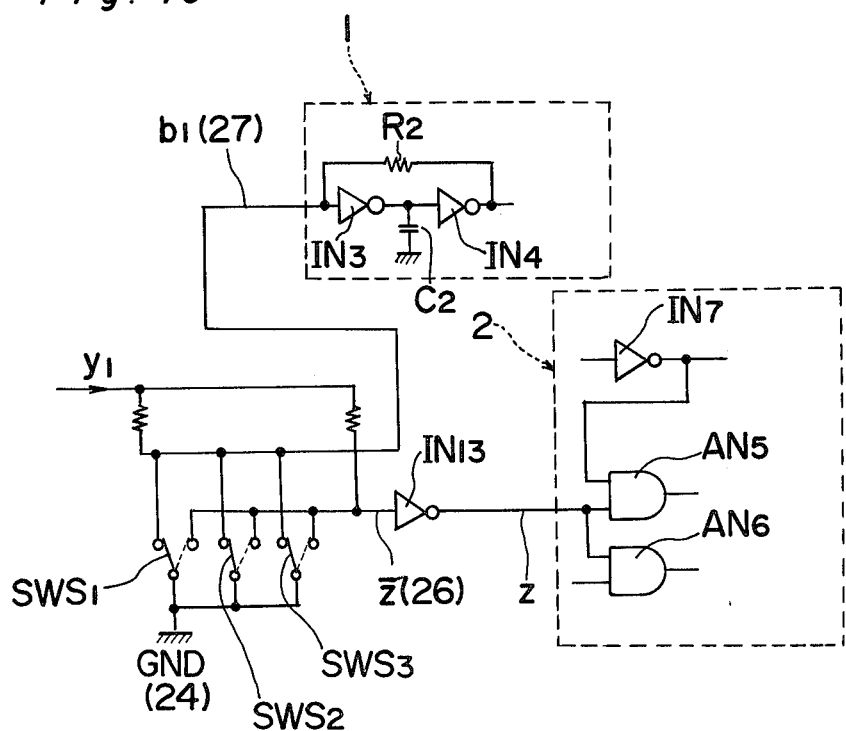
FIG. 10 is a circuit diagram showing an electric circuit for spool switches incorporated in a modified form of the film take-up spool assembly.

The take-up spool assembly shown in FIGS. 8 and 9 is so designed that, when the spool flaps 22 are in the closed positions as shown by the chain lines in FIG. 9 against the torsion springs 25, the terminal member 24 is electrically connected to the terminal ring 26 through respective points 22b of contact of the springs 25 to the spool flaps 22, whereas when the spool flaps 22 are in the opened positions shown by the solid lines in FIG. 9 as biased by the respective springs 25, the terminal member 24 is electrically connected to the terminal ring 27 through the respective points 22b of contact of the springs 25 to the spool flaps 22. Accordingly, it will readily be seen that the take-up spool assembly incorporates ,therein a combination of switches which is turned off when the film is wound around the spool in a single turn during the film wind-up and which is turned off when the film being rewound disengages from the spool, respectively. An equivalent electric circuit of the combination switch built in the take-up spool assembly is shown in FIG. 10 wherein each movable contact member shown as movable selectively between two positions shown respectively by the solid line and the broken line is structurally and functionally constituted by the respective spool flap 22. Referring to FIG. 10, when the film has been wound around the spool assembly with the spool flaps consequently held in the closed positions, the terminal members 26 and 24 are electrically connected to each other through the contact points 22b and, hence, the spool switches SWS1, SWS2 and SWS3 assume the condition as shown by the solid lines in FIG. 10. In this condition, the terminal $b_1$ is in a high level state, while the inverter $IN_{13}$ generates its output z which is in a high level state. The high level state at the terminal z is maintained so long as the film is not disengaged from the spool assembly with the spool flaps 22 consequently held in the opened positions, and accordingly, the warning circuit continues giving the warning until the film being rewound disengages from the spool assembly. On the other hand, during the film loading procedure, unless all of the spool flaps 22 are brought into the closed positions, the terminal $b_1$ to which the contact points 22b and the terminal members 27 and 24 are connected is held in a low level state.

The wind-up switch operatively associated with the wind-up will now be described in details with reference to FIGS. 11 and 12. The switch in the example shown in FIG. 11 is suited for use in the camera of a type wherein, when the wind-up is interrupted before it completes, the film wind-up lever (not shown) does not return completely to its rest position. On the contrary thereto, the switch in the example shown in FIG. 12 is suited for use in the camera of a type wherein, when the wind-up is interrupted before it completes, the film wind-up lever returns completely to its rest position.

Figure 11A:
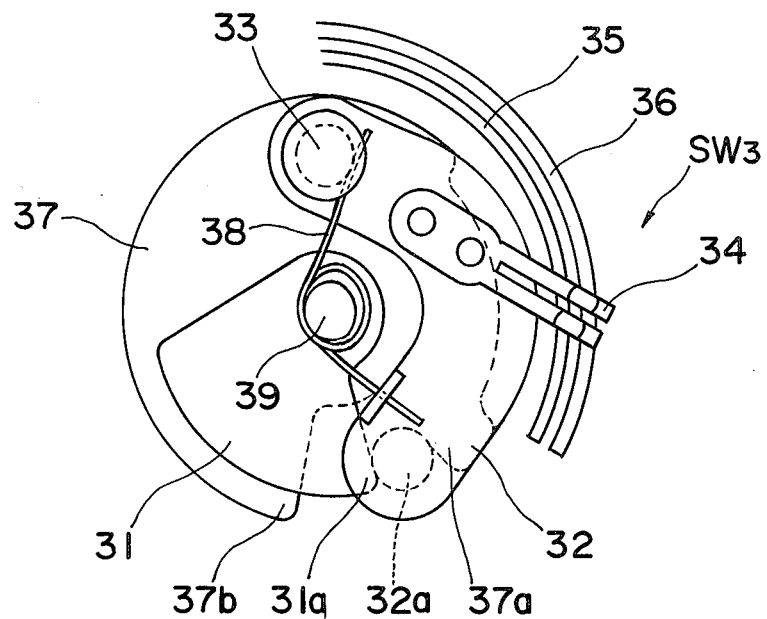
FIG. 11(a) is a top plan view of a wind-up switch held in a condition during the film wind-up operation.

Referring first to FIG. 11, FIG. 11(a) shows the condition in which the wind-up is being performed. A drive lever 31 movable together with the film wind-up lever is rotatably mounted on a shaft 39. A wind-up plate 37 for driving the take-up spool assembly and a sprocket wheel (not shown) is also rotatably mounted on the shaft 39. A switch lever 32 is pivotally mounted on the wind-up plate 37 by means of a pin 33 and is normally biased clockwise by a torsion spring 38 having its opposite ends engaged to the pin 33 and a free end of the switch lever 32, respectively. A contact piece 34 secured at one end to the switch lever 32 is slidingly engageable with planar conductors 35 and 36 provided on a fixed surface independent of the film wind-up and drive mechanism. In this construction, when the drive lever 31 is moved counterclockwise, a portion 31a of the drive lever 31 pushes a pin 32a rigid on the switch lever 32, causing the switch lever 32 to be moved counterclockwise against the torsion spring 38. By this movement, the contact piece 34 is brought into contact with both of the conductors 35 and 36, thereby connecting the conductors 35 and 36 together. This is the condition in which the wind-up switch SW3 is turned on. On the other hand, the pin 32a pushes a portion of the wind-up plate 37 to rotate the wind-up plate 37 counterclockwise; and accordingly, the film can be advanced by the sprocket wheel while being wound onto the spool assembly.

Figure 11B:
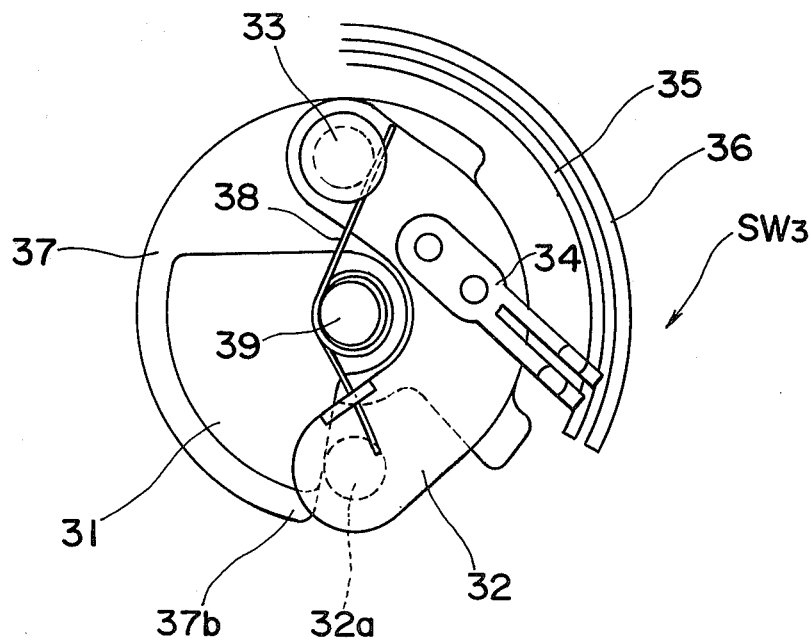
FIG. 11(b) is a view similar to FIG. 11(a) with the wind-up switch shown as held in a condition established when the film wind-up operation is interrupted.
Figure 12A:
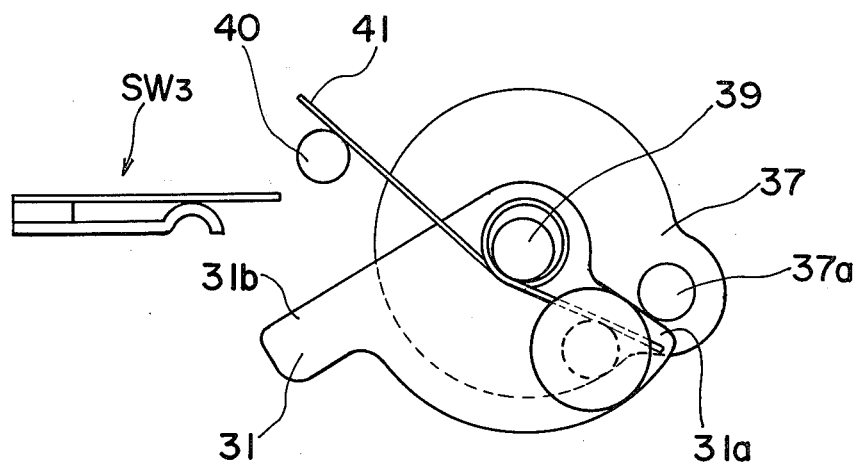
FIGS. 12(a) and 12(b) are views similar to FIGS. 11(a) and 11(b), respectively, showing a modified form of the wind-up switch.
Figure 12B:
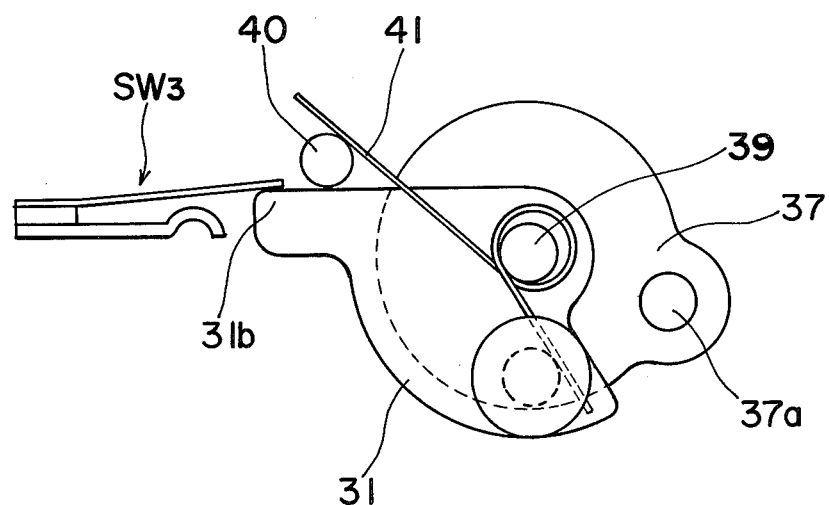

The condition in which, before the wind-up completes, the wind-up is interrupted will now be described with reference to FIG. 11(b). When a force applied to the drive lever 31 to rotate the latter counterclockwise is released, the switch lever 32 is pivoted clockwise by the action of the torsion spring, resulting in the separation of the contact piece 34 away from the conductors 35 and 36. This is the condition n which the wind-up switch SW3 is turned off. On the other hand, the pin 32a causes the drive plate 31 to return to a position adjacent another portion 37b of the wind-up plate 37. According to this method, the switch SW3 can be turned on only when a force necessary to rotate the drive lever 31 is applied through the film wind-up lever, but is turned off when the force necessary to rotate the drive lever 31 is released after or before the completion of the wind-up.

Where the camera is of the type wherein, when the wind-up is interrupted, the film wind-up lever can return to its rest position, as shown in FIG. 12, a drive lever 31 movable together with the film wind-up lever (not shown) is pivotally mounted on a shaft 39, and a torsion spring 41 is mounted so as to bias the drive lever 31 until a tongue-like end 31b of the lever 31 abuts a fixed pin 40, as best shown in FIG. 12(b). A wind-up lever 37 for driving the spool assembly and the sprocket wheel can rotate when a pin 37a rigid on the wind-up plate 37 is pushed by a portion 31a of the drive lever 31 opposite to the tongue-like end 31b.

Figure 13:
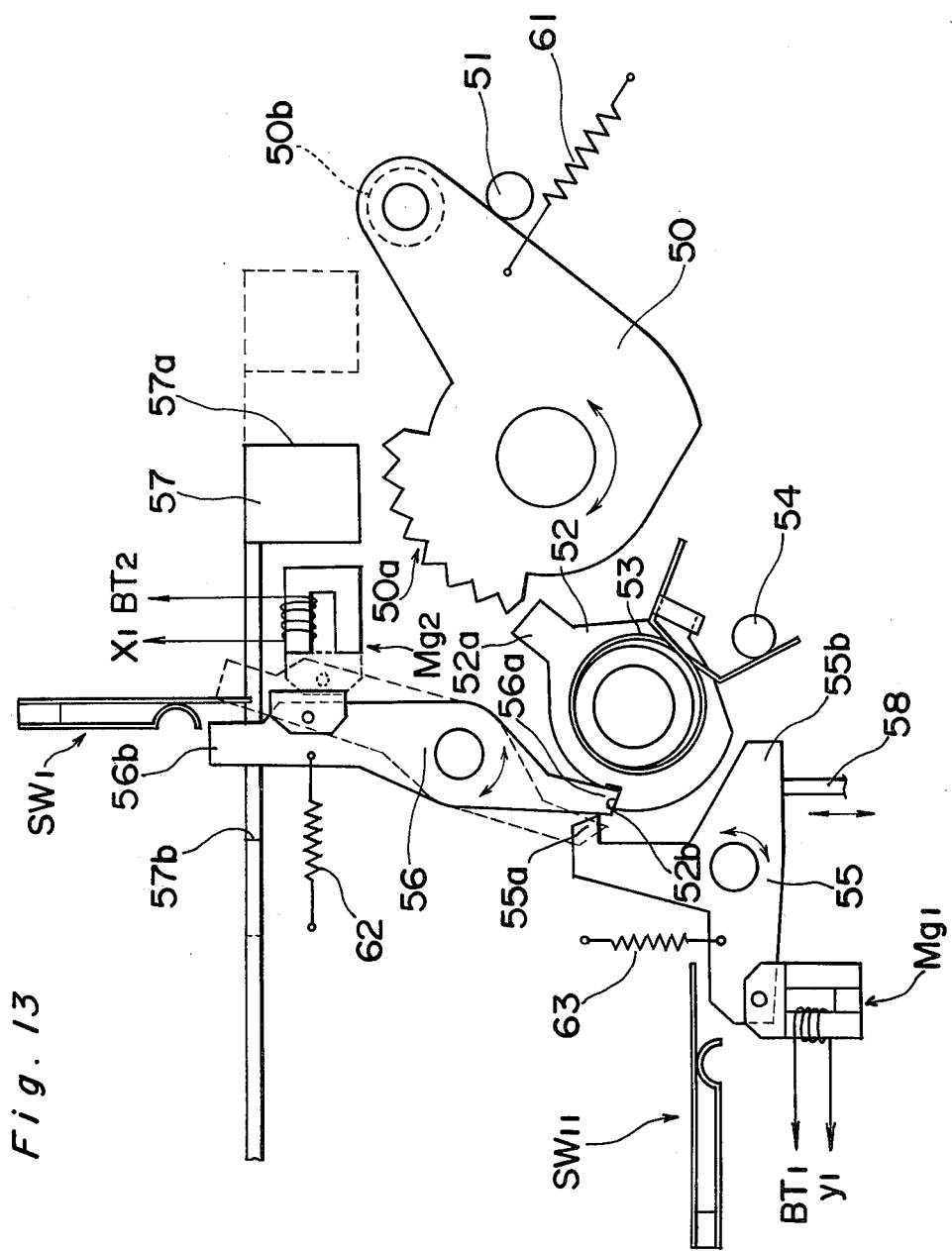
FIG. 13 is a schematic diagram showing the principle of a film wind-up mechanism used in the camera according to the present invention.

FIG. 12(a) illustrates the condition in which the wind-up is being performed. In this condition, the normally closed wind-up switch SW3 is closed. The drive lever 31 is rotated counterclockwise against the torsion spring 41 with that portion 31a thereof pushing the pin 37a, and therefore, the wind-up plate 37 is rotated counterclockwise. When the force applied to the drive lever 31 to rotate the latter is released at the time of or before the completion of the wind-up, the wind-up plate 37 is brought to a halt at the position to which it has been moved and only the drive lever 31 is rotated clockwise by the action of the torsion spring 41 until the tongue-like end 31b thereof abuts the fixed pin 40. At the same time, that end 31b of the drive lever 31 causes the normally closed switch SW3 to be opened as best shown in FIG. 12(b). According to this method, the switch SW3 can be turned on when the film wind-up lever is manipulated, but can be turned off when the manipulation of the film wind-up lever is interrupted and the film wind-up lever consequently returns automatically to the rest position. The principle of the film wind-up mechanism according to the present invention is shown in FIG. 13. Referring to FIG. 13, at the time of completion of the exposure control, a shutter charging member 57 is moved to a position shown by the broken line with a cutout 57b in the shutter charging member 57 pushing one end 56b of a first engagement lever 56 in a rightward direction to cause the lever 56 to pivot against a spring 62 to a position shown by the broken line. When the engagement lever 56 is so pivoted to the position shown by the broken line, the switch SW1 is opened. In addition, a pawl 56a integral with the other end of the first engagement lever 56 is disengaged from a notch 52b in a rotary lever 52 thereby to release the film wind-up refraining. Upon this disengagement of the first engagement lever 56, the rotary lever 52 is rotated clockwise by the action of a spring 53 to bring the film wind-up lever 50 into a condition ready to be rotated. When the wind-up lever 50 is subsequently rotated counterclockwise against a spring 61, the rotary lever 52 is rotated by the wind-up lever 50 with an upper end of a projection 52a in the rotary lever 52 pushed by and in engagement with a left-hand inclined edge, as viewed in FIG. 13, of a ratchet portion 50a of the lever 50. When the wind-up is interrupted, since a right-hand inclined edge of the ratchet portion 50a pushes the tip of the projection 52a, the wind-up lever 50 does not return to the position shown in FIG. 13. A pin 50b rigid on the wind-up lever 50 pushes one end of the shutter charging member 57 in a leftward direction thereby effecting the shutter charging. Then, the engagement between the cutout 57b and the end 56b of the first engagement lever 56 is released to establish the condition in which the wind-up is ready to be refrained. Upon completion of the wind-up lever 50 and subsequent completion of both the film wind-up and the shutter charging, the rotary lever 52 is rotated counterclockwise by the action of the spring 53 thereby rendering the wind-up lever 50 ready to be rotated clockwise. By the action of the spring 61, the wind-up lever 50 is rotated clockwise to the original position shown in FIG. 13 with the right-hand inclined edge of the ratchet portion pushing a lower end of the projection 52a of the rotary lever 52 upwardly. Then, the engagement between the ratchet portion 50a and the projection 52a is released, allowing the rotary lever 52 to rotate clockwise by the action of the spring 53, and therefore, the pawl 56a at the tip of the first engagement lever 56 is engaged in the notch 52b in the rotary lever 52 to refrain the wind-up. Simultaneously therewith, the end 56b of the engagement lever 56 separates from the switch SW1 and, therefore, the shutter release is possible at any time as hereinbefore described.

Figure 14:
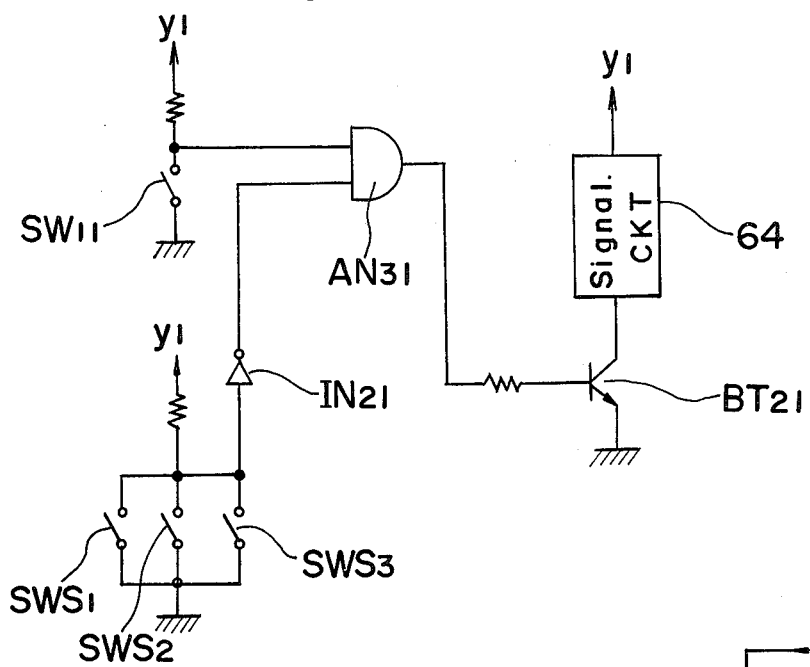
FIG. 14 is a circuit diagram showing a circuit including a release signaling circuit.

When the film is loaded, the wind-up is performed in a manner similar to that hereinbefore described, and during the period in which a single wind-up is performed, the respective switching states of the spool switches SWS1, SWS2 and SWS3 change and the electromagnet $Mg_1$ conducts. Upon conduction of the electromagnet $Mg_1$, a second engagement lever 55 is brought by a spring 63 into a position ready to engage. In this condition, a switch SW11, which will be described later in details in connection with a release signaling circuit with reference to FIG. 14, is opened. Thus, unless the camera back lid is closed, no wind-up can be performed. Although the shutter release can be performed at this time since the first engagement lever 56 is also engaged with the switch SW1 consequently closed, the film will not be adversely affected even though the exposure control actually takes place. This is because the camera back lid is opened at this time.

When the camera back lid is subsequently closed, a release member 58 movable in response to the closure of the camera back lid is upwardly shifted to release the engagement done by the second engagement lever 55. In addition, as hereinbefore described, all of the spool switch SWS1, SWS2 and SWS3 are opened and the electromagnet $Mg_2$ conducts in response to the closure of the camera back lid to attract the first engagement lever 56 against the spring 62. When the first engagement lever 56 is so attracted by the electromagnet $Mg_2$, not only can the wind-up be not refrained, but also the switch SW1 is opened to disable the shutter release. Accordingly, before the initial frame of the film is brought into alignment with the exposure station, the preparatory film wind-up can be effected even though no exposure control is performed. It is to be noted that the electromagnet $Mg_2$ is preferably in the form of a plunger type.

However, with the mechanism shown in FIG. 13, in the event that the film which has once been loaded and the engagement has therefore been effected by the second engagement lever 55 is removed without the camera back lid having been been ever closed, it is not possible to perform a wind-up of the film, which has been again loaded in the camera at a different occasion, without the camera back lid being once closed. This disadvantage can be overcome by the use of a circuit shown in FIG. 14.

Referring to FIG. 14, when the film is removed, all of the spool switches SWS1, SWS2 and SWS3 are closed and, consequently, an inverter $IN_{21}$ generates a high level output. On the other hand, since the engagement by the second engagement lever 55 remains effected, the switch SW11 is in an opened position, and therefore, an AND gate $AN_{31}$ generates a high level signal which is applied to a transistor $BT_{21}$ to bring the latter into a conducting state. Upon conduction of this transistor $BT_{21}$, the release signaling circuit 64 is activated to inform the photographer that the engagement should be released by once closing the camera back lid. This circuit 64 includes a light-emitting diode and/or a piezoelectric buzzer. The warning given by this circuit 64 nevertheless continues until the engagement by the second engagement lever 55 is released and the switch SW11 is consequently closed.

Figure 15:
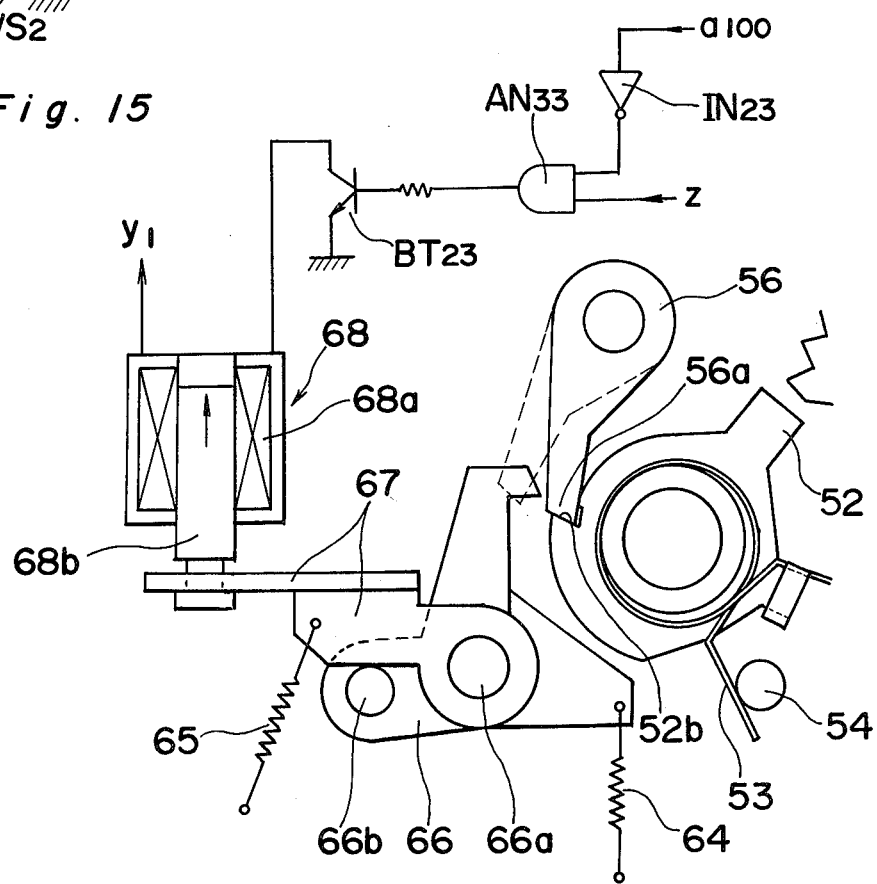
FIG. 15 is a schematic diagram showing a modified form of the film wind-up mechanism.

FIG. 15 illustrates a modified form of the wind-up mechanism. In this construction shown in FIG. 15, only differences relative to that shown in FIG. 13 are illustrated. Referring to FIG. 15, when and so long as the camera back lid is opened with no film having yet been loaded, the terminal z is in a low level state and, therefore, an output from an AND gate $AN_{33}$ is in a low level state. In this condition, both of a transistor $BT_{23}$ and a plunger type electromagnet 68 are held in a non-conducting state. In addition, since a spring 65 exerts a force greater than that exerted by a spring 64, a lever 67 pivotable about a pivot pin 66a is engaged to a pin 66b rigid on the second engagement lever 66 thereby applying to the second engagement lever 66 a force necessary to rotate the lever 66 counterclockwise about the pivot pin 66a. Accordingly, any wind-up refraining resulting from the second engagement lever 66 is not effected.

However, when the film is subsequently loaded, but the camera back lid has not yet been closed, the AND gate $AN_{33}$ generates a high level signal because the terminals z and $a_{100}$ are respectively in high and low level states at this time and the low level signal from the terminal z is converted into a high level state by an inverter $IN_{23}$. The high level signal from the AND gate $AN_{33}$ is then applied to the transistor $BT_{33}$ to bring the latter into a conducting state, followed by the conduction of a coil 68a of the electromagnetic coil 68. When this occurs, a plunger 68b is pulled upwards as shown by the arrow in FIG. 15, accompanied by the clockwise rotation of the lever 67 against the spring 65 to bring the second engagement lever 66 to a position ready to effect the engagement as biased by the spring 64. Upon subsequent completion of the wind-up, the wind-up refraining is effected by the second engagement lever 66.

When the camera back lid is closed while the refraining is effected by the second engagement lever 66, the terminal $a_{100}$ is brought into a high level state and, therefore, outputs from the inverter $IN^{23}$ and AND gate $AN^{23}$ are respectively brought into low level states. Therefore, the coil 68a is brought into a non-conducting state with the plunger 68b consequently pulled downwards by the spring 65, resulting in that the lever 67 and the second engagement lever 66 are rotated counterclockwise about the pin 66a to release the wind-up refraining.

Where the film once loaded is removed with the camera back lid having never been closed, the terminal z is in a low level state and, therefore, the coil 68b is non-conducting. Accordingly, the plunger 68b is downwardly pulled after all and the engagement done by the second engagement lever 66 is released. However, since the engagement by the first engagement lever 56 is still effected at this time, the wind-up for the film loading cannot be performed unless the first engagement lever 56 is released by effecting the exposure control.

Figure 16:
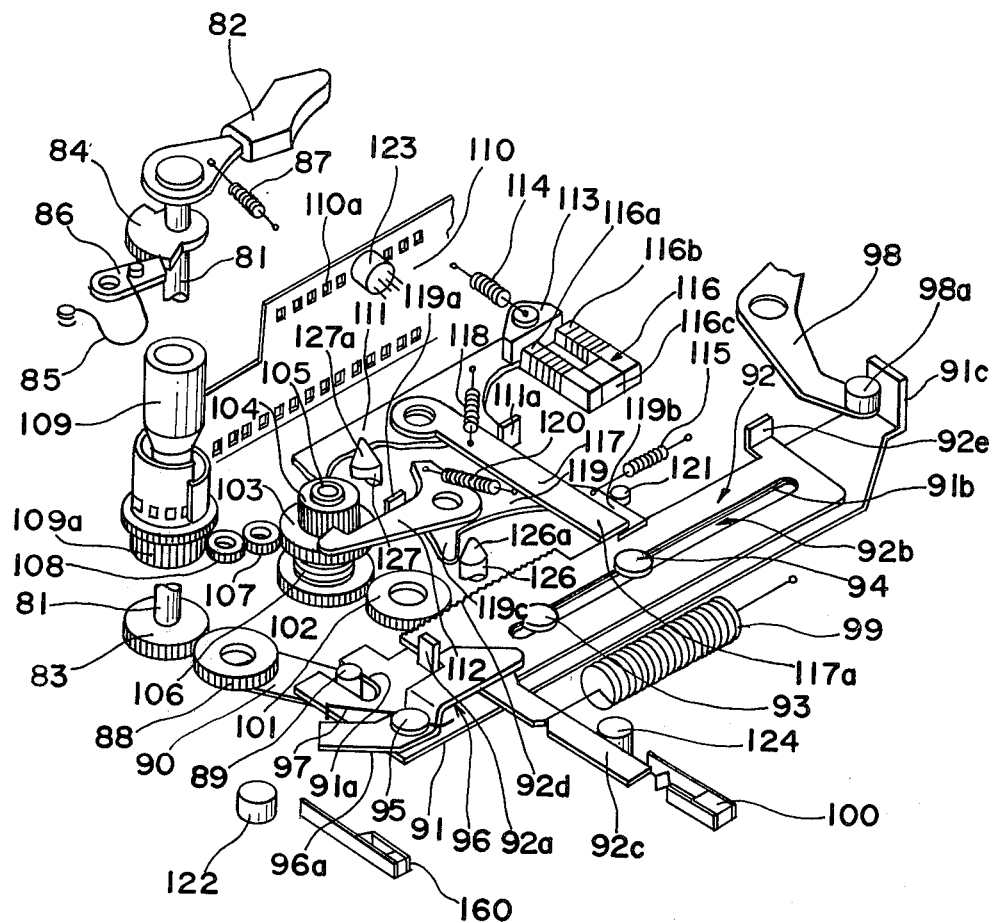
FIG. 16 is a perspective view of the film wind-up mechanism which is designed so as to be operable without the use of the signal retention circuit.

The photographic camera according to the embodiment shown in FIGS. 1 to 15 is so designed that, when the information coded in the code region and the sprocket holes are to be read out, the electrical power supply to the detector can be effected during the film wind-up, but interrupted during the interruption of the film wind-up. With this construction, a sprocket hole detection signal may be repeatedly outputed in the event that the film wind-up is interrupted with one sprocket hole aligned with the detecting position and the film wind-up is resumed subsequently. Once this occurs, the amount of the film wound up will become short of the required amount. Therefore, the camera according to the embodiment shown in FIGS. 1 to 15 is provided with the signal retention circuit 5 (shown in FIGS. 1 and 6(a)) for retaining the sprocket hole detection signal during the interruption of the electrical power supply. However, the camera according to the embodiment of the present invention to be described subsequently with reference to and shown in FIG. 16 is so designed as to be satisfactorily operable without such signal retention circuit as required in the camera according to the foregoing embodiment. Specifically, the device shown in FIG. 16 is so designed that the film wind-up mechanism can be charged by the manipulation of the wind-up lever, the actual film wind-up being subsequently performed by the force so charged. With this arrangement there is no possibility that the film wind-up is interrupted halfway.

Figure 17:
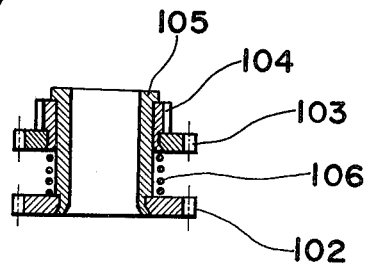
FIG. 17 is a longitudinal sectional view of a component part used in the mechanism shown in FIG. 16.

Referring to FIG. 16, a wind-up lever axle 81 is connected at one end with a wind-up lever 82 biased clockwise by a spring 87 for rotation together therewith, and at the other end with a gear 83 for rotation together therewith. The wind-up lever axle 81 is provided with a generally sector-shaped ratchet 84 to which a reverse rotation preventive lever 86, biased by a spring 85, is engaged. A gear 88 meshed with a gear 83 is rigidly mounted on a lever 90 having a pin 89 rigidly mounted thereon, said pin 89 being engaged in a U-shaped cutout 91a in a first slide plate 91. A second slide plate 92 is positioned on the first slide plate 91, the both of said plates 91 and 92 being formed with respective guide slots 91b and 92b through which guide pins 93 and 94 mounted on a fixed plate (not shown) extends. An engagement lever 96 pivotally mounted on the first slide plate 91 through a pin 95 is biased counterclockwise, as viewed in FIG. 16, by a biasing spring 97 and is engaged to an upright member 92a integral with the second slide member 92. To an upright member 91c integral with the first slide plate 91 is engaged a pin 98a rigidly mounted on a charge lever 98 for charging a drive mechanism for a shutter, a diaphragm, a mirror and others (not shown). A normally closed switch 160 is positioned on a left-hand side of the first slide plate 91 so that it can be opened when the first slide plate 91 being moved in a leftward direction arrives at a final position of its movement in the leftward direction. An arm 92c extending generally at right angles to the longitudinal axis of the second slide plate 92 has a spring 99 extending between it and a fixed plate (not shown). Adjacent the tip of the arm 92c is positioned a switch 100, the switching of this switch 100 being effected by the movement of the second slide plate 92. The second slide plate 92 is formed with a rack portion 92d positioned on one side opposite to the arm 92c and meshed with a gear 101 for transmitting a drive force to a gear 102 through the gear 101. This gear 102 is secured on a lower end of a guide shaft 105, an upper end of said guide shaft 105 having a gear 103 and a ratchet gear 104 integrally mounted thereon as best shown in FIG. 17. Both of the gears 103 and 104 rotatable together therewith are rotatable about the guide shaft 105 and are normally upwardly biased by a compression spring 106, mounted on the gear 102 and around the guide shaft 105, with the gear 104 abutting a flange at the upper end of the shaft 105. The gears 103 and 102 are rotatable together under friction developed by the compression spring 106 interposed therebetween. The gear 103 is operatively coupled to a gear 109a, integral with a spool 109, through idle gears 107 and 108 for transmitting a rotational force to the spool 109. The spool 109 is so rotatably mounted on the wind-up axle 81 as to wind up the film. The ratchet gear 104 is operatively associated with a first lock lever 111, normally biased counterclockwise by a spring 114 through a movable piece 113 and selectively engageable therewith, and a second lock lever 112 normally biased counterclockwise by a spring 115 through an overcharge lever 119 and selectively engageable therewith. The movable piece 113 is adapted to be selectively attracted by and separated from an electromagnet 116 positioned adjacent one end of the first lock lever 111 remote from the ratchet gear 104. A shaft about which the first lock lever 111 rotates has a set lever 117 rotatably mounted thereon, and a spring 118 is suspended between this set lever 117 and the first lock lever 111. This spring 118 acts to bias the first lock lever 111 in a clockwise direction and the lever 117 in a counterclockwise direction, and an upright member 111a fast with the first lock lever 111 receives the set lever 117 engaged thereto. On the other hand, a shaft about which the second lock lever 112 rotates has the over-charge lever 119 rotatably mounted thereon, and a spring 120 is suspended between these levers 112 and 119 so that the second lock lever 112 can abut against an upright member 119a integral with the over-charge lever 119. The second lock lever 112 is biased counterclockwise by a spring 115 connected to the over-charge lever 119 and is restricted from further rotating by a stopper pin 121 rigid on a fixed plate (not shown). One end 119b of the over-charge lever 119 and one end 117a of the set lever 117 are situated on the path of movement of the upright member 92e on the second slide plate 92.

The device shown in FIG. 16 operates in the following manner.

When the wind-up lever 82 is rotated counterclockwise, the gear 83 rotates together therewith and the gear 88 rotate clockwise. The pin 89 causes the first slide plate 91 to move in a leftward direction, as viewed in FIG. 16, while guided by the guide pins 93 and 94. During this movement of the first slide plate 91, the upright member 91c causes the charge lever 98 to rotate clockwise to charge the drive system for the shutter, the diaphragm, the mirror and others. On the other hand, the engagement lever 96 is engaged to the upright member 92a on the second slide plate 92 and, therefore, the second slide plate 92 is also moved leftwards together with the first slide plate 91 while guided by the guide pins 93 and 94. As a result of this movement, the spring 99 for the film wind-up is pulled leftwards to accumulate a charging force. At this time, the movable piece 113 of the electromagnet 116 is in a separated condition and the first lock lever 111 is biased counterclockwise by the spring 114 with its one end engaged in the ratchet gear 104. The gear 103 is held in a non-rotatable condition together with the ratchet gear 104. In addition, the leftward movement of the second slide plate 92 is transmitted through the gear 101, meshed with the rack portion 92d, to the gear 102 to rotate the latter, but the rotational force of the gear 102 is not substantially transmitted to the gear 104 because the gear 102 rotates under friction, imparted by the spring 106, relative to the gear 104 without causing the latter to rotate.

As the wind-up lever 82 is further rotated, accompanied by the corresponding leftward movement of the second slide plate 92, the upright member 92e is brought into engagement with the over-charge lever 119, thereby causing the latter to pivot clockwise against the spring 115. Upon this pivotal movement, the second slide plate 112 is also rotated clockwise to engage with the ratchet gear 104. In addition, the further leftward movement of the second slide plate 92 results in abutment of the upright member 92e to one end 117a of the set lever 117 to cause the latter to pivot clockwise. This pivotal movement of the set lever 117 takes place in pursuit of the first lock lever 111 as it is pulled by the spring 118 and, during this movement, the first lock lever 111 pulls the spring 114 outwards to permit the latter to accumulate a biasing force. Thereupon, the first lock lever 111 disengages from the ratchet gear 104. At this time, the movable piece 113 of the electromagnet 116 carried by one end of the first lock lever 111 abuts yoke portions 116a and 116b and the movable piece 113 is firmly attracted by the magnetic force exerted by a permanent magnet 116c.

Figure 18:
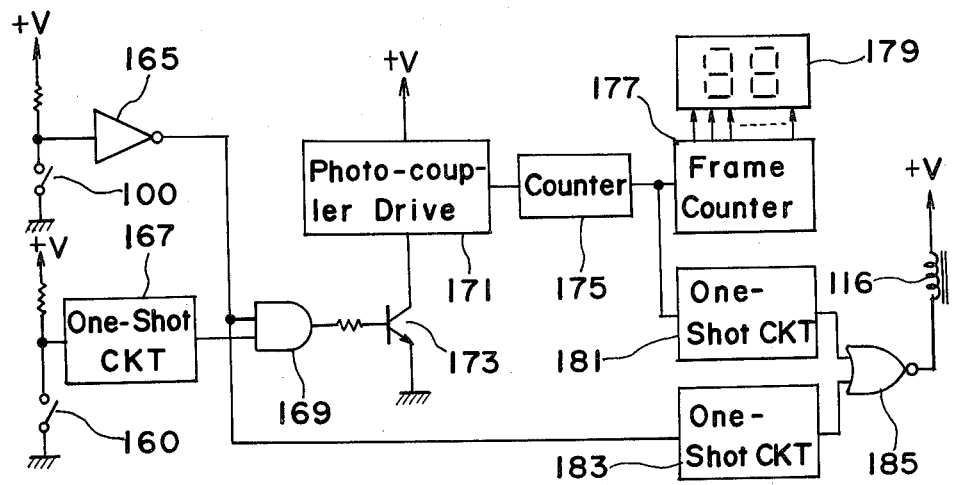
FIG. 18 is a block diagram showing a circuit suited for use with the mechanism shown in FIG. 16.

The continued leftward movement of the first slide plate 91 results in abutment of one end 96a of the engagement lever 96 to a pin 122 rigid on the fixed plate (not shown), with said pin 122 consequently causing the engagement lever 96 to rotate clockwise against the spring 97 whereby the engagement between the engagement lever 96 and the upright member 92a fast with the second slide plate 92 is released. Upon the disengagement of the engagement lever 96 from the upright member 92a, the second slide plate 92 is abruptly moved in a rightward direction by the force charged on the film wind-up spring 99. By this rightward movement, the upright member 92e fast with the second slide plate 92 is separated from the end 117a of the set lever 117, but the first lock lever 111 has already been retained by the magnetic force of the permanent magnet 116c of the electromagnet 116 at a position not engageable with the ratchet gear 104. When starting from this the upright member 92e is further moved rightwards, it separates from the end 119b of the over-charge lever 119 whereby the second lock lever 112, which has been engaged with the ratchet gear 104, is rotated counterclockwise by the spring 115, thereby disengaging from the ratchet gear 104. Thereby, the ratchet gear 104 is rendered free to rotate, and the rotational force is transmitted to the gear 102 by the rightward movement of the rack portion 92d on the second slide plate 92 and also to the gear 103 which is frictionally engaged therewith through the spring 106. As the gear 103 rotates, the rotational force is transmitted to the gear 109a integral with the spool 119 through the idle gears 107 and 108 and the spool 109 is therefore rotated counterclockwise to wind up the film onto the spool 109. The film so wound onto the spool 109 moves in a leftward direction and, at this time, the successive sprocket holes are detected by a photo-optical sensor 123 one at a time. When the film is moved a distance corresponding to one film frame, a processing circuit as will be described later with reference to FIG. 18 is caused to generate an electrical signal necessary to effect the supply of an electric current through the coil 116a of the electromagnet 116 for cancelling the magnetic force of the permanent magnet 116c thereby allowing the movable piece 113 to be released from the magnetic force of the permanent magnet 116c. Upon release of the movable piece 113 from the magnetic force of the permanent magnet 116c, the first lock lever 111 is rotated counterclockwise by the spring 114 to stop the rotation of the ratchet gear 104. When the ratchet gear 104 is so stopped, the gear 103 integrally coupled therewith also stops and, therefore, the movement of the film is interrupted. However, since the gear 103 is merely frictionally engaged with the gear 103, the gear 102 continues to rotate until the end 92c of the second slide plate 92 abuts the stopper pin 124. An obstruction provided for by the reverse rotation preventive lever 86 which, when the wind-up lever 82 had been rotated a predetermined angle, has prevented the sector-shaped ratchet 84 from rotating clockwise is now removed and, therefore, the wind-up lever 82 can be rotated clockwise by the action of the spring 87. By this clockwise rotation of the wind-up lever 82, the first slide plate 91 is moved rightwards with the engagement lever 96 subsequently engaged with the upright member 92a on the second slide plate 92, thereby establishing the condition as shown in FIG. 16 in readiness for the next succeeding taking of a photograph. However, since the charge lever 98 for the drive mechanism for the shutter, the diaphragm, the mirror and others is so designed as to be inoperable once it is charged and until a trailing shutter curtain of the shutter is moved completely by a mechanism not shown, the first slide plate 91 cannot be moved leftwards and, thus, the counterclockwise rotation of the wind-up lever 82 is disabled unless the next succeeding taking of a photograph completes.

In the case of the multiple exposure photography and the film rewinding, the wind-up mechanism shown in FIG. 16 operates in the following manner.

Where the multiple exposure is desired, a multiple exposure button 126 is upwardly projected by an external manipulation as shown, so that a tapered portion 126a of the button 126 can push the end 119c of the over-charge lever 119 to cause the latter to rotate clockwise against the spring 115. Upon clockwise rotation of the over-charge lever 119, the second lock lever 112 is rotated clockwise by the spring 120 in pursuit thereof, finally engaging the ratchet gear 104. Even when the wind-up lever 82 is manipulated at this time, the gear 109a does not rotate and, therefore, the film 110 is not advanced, but the charge lever 98 is operated on the basis of the rotary drive of the gear 83 to charge the drive mechanism for the shutter, the diaphragm, the mirror and others in a manner similar to that hereinbefore described. Thus, the camera is ready to effect multiple exposures while the film remains without having been advanced.

In the case of the film rewinding, before the film which has been used, i.e., exposed, and is, therefore, desired to be rewound into the cartridge or magazine, is rewound into the cartridge or magazine, the R button 127 is projected, as shown, by an external manipulation to allow a tapered portion 127a of the button 127 to push the first lock lever 111 thereby causing the latter to rotate clockwise against the spring 114. The first lock lever 111 is then disengaged from the ratchet gear 104. Since the second lock lever 112 is not engaged with the ratchet gear 104 at this time, the gear 103 is caused by a rewind lever (not shown) to rotate while slipping frictionally relative to the gear 102 to permit the film 110 to be moved in a rightward direction and then into the cartridge or magazine.

The circuit suited for use with the wind-up mechanism shown in FIG. 16 is shown in FIG. 18.

Referring now to FIG. 18, at the time the second slide plate 92 starts its movement upon manipulation of the wind-up lever 82 to effect the film wind-up, the switch 100 is closed and an output from an inverter 165 is therefore in a high level state. Thereby, a one-shot circuit 183 generates a high level pulse of a predetermined pulse width, and the electromagnet 116 is caused through a NOR gate 185 to conduct, resulting in that the movable piece 113 if attracted thereby is separated therefrom. It is to be noted that it is when the film rewind completes and when no film is loaded that the movable piece 113 is attracted by the electromagnet 116 at the time of the initiation of manipulation of the wind-up lever 82. When the movable piece 113 is so separated, the engagement by the first lock lever 111 is effected, thereby preventing the spool 109 from being rotated in a reverse direction during the manipulation of the wind-up lever 82.

When the wind-up lever 82 has arrived at the final position of the wind-up stroke, the first slide plate 91 opens the switch 160 and, therefore, the one-shot circuit 167 is triggered in response to a signal indicative of the set-up to a high level state to generate a high level signal for a predetermined period of time which is longer than the time required for each film frame to be wound-up by the action of the spring 99. At this time, since the switch 100 is closed, the AND gate 169 generates a high level signal which is in turn supplied to the transistor 173 to bring the latter into a conducting state to allow the supply of an electrical power to a drive circuit 171 for driving a photo-coupler 123 for the detection of the sprocket holes 110.

When the first slide plate 91 arrives at a position whereat the switch 160 is opened, the second slide plate 92 is moved rightwards, as hereinbefore described, to cause the film 110 to be wound up. Incident to this movement of the film, the photo-coupler drive circuit 171 generates a pulse output indicative of the number of the sprocket holes passed, which is in turn supplied to a counter 175. The counter 175 counts the number of pulses from the drive circuit 171 to determine whether or not the film has been already advanced a distance corresponding to one film frame, and after the counter 175 has counted a predetermined number of the pulses corresponding to one film frame, the counter 175 generates a high level signal which is in turn supplied to both a frame counter 177 and a one-shot circuit 181. In response to the high level signal from the counter 175, the one-shot circuit 181 generates a high level signal with which the electromagnet 116 is brought into the conducting state with the movable piece 113 consequently separated, thereby stopping the wind-up. On the other hand, the high level signal from the counter 175 activates the frame counter 177 whereat the amount of the film wound up is counted, and the amount of the film wound up is displayed by a display unit 179 including two 7-segment display elements capable of displaying two digits.

Figure 19:
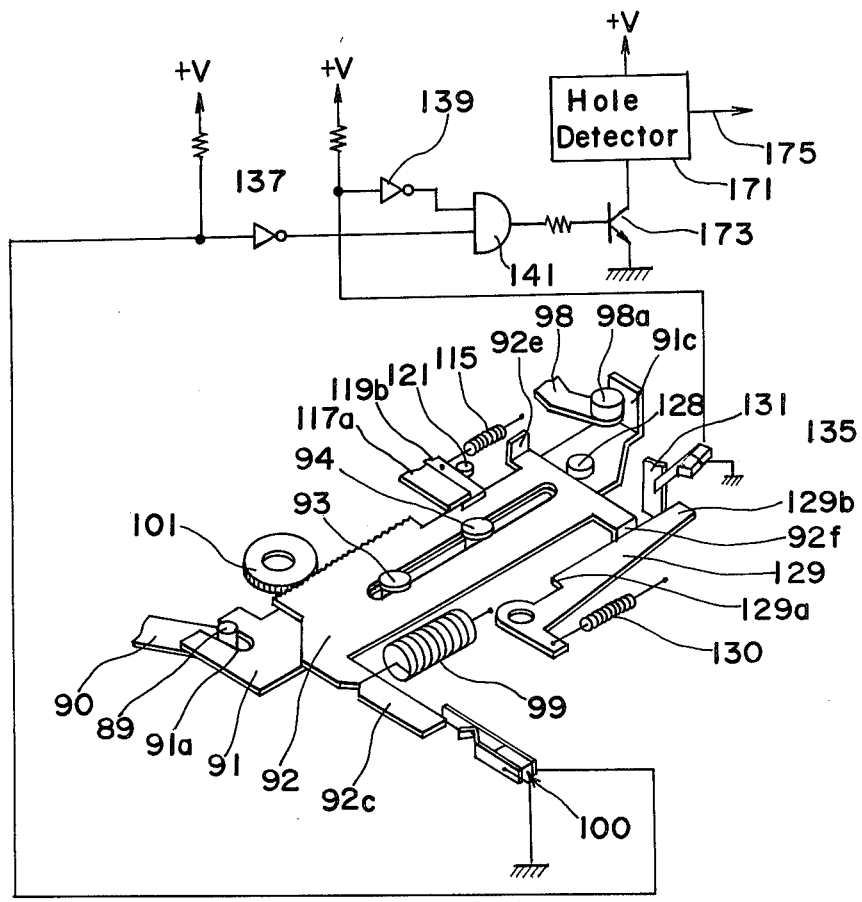
FIG. 19 is a diagram showing a modified form of the mechanism of FIG. 16 shown together with an electric circuit suited for use therewith.

FIG. 19 illustrates a modified form of the mechanism shown in FIG. 16 together with an electric circuit suited for use therewith. This modified mechanism is so designed that, while the charging of the drive mechanism for the shutter, the diaphragm, the mirror and others is effected by rotating the wind-up lever 82, an energy necessary to advance the film can be accumulated on a spring during that time, which accumulated energy is released to effect the film advance immediately after completion of the exposure control. Since the modified mechanism of FIG. 19 differs from the mechanism of FIG. 16 in the timing at which the engagement by the second slide plate 92 is released while the spring 99 for the film advance is charged, only an essential portion thereof will be described. Referring to FIG. 19, when the wind-up lever 82 is rotated counterclockwise, the first slide plate 91 is moved leftwards with the upright member 91c causing the charge lever 98 to pivot clockwise for charging the drive mechanism for the shutter, the diaphragm, the mirror and others. During this leftward movement of the first slide plate 91, the second slide plate 92 is pushed by a pin 128 rigidly mounted on the first slide plate 91 and, therefore, the slide plate 92 is moved leftwards while charging the film wind-up spring 99. As the second slide plate 92 is further moved leftward from this position, a downwardly extending projection 92f on the second slide plate 92 engages an engagement step 129a in an engagement lever 129 normally biased counterclockwise by a spring 130. As the wind-up lever 82 is further rotated counterclockwise, a reverse rotation preventive mechanism including the preventive lever 86 for preventing the sector-shaped ratchet 84 from rotating in a reverse direction (clockwise) is disabled and, therefore, the wind-up lever 82 can be returned towards its rest position by the action of the spring 87. By the clockwise return movement of the wind-up lever 82, the first slide plate 91 is moved rightwards to the position shown in FIG. 19. On the other hand, since the second slide plate 92 is trapped by the engagement lever 129 through the downwardly extending projection 92f, it remains at the eftwardly displaced position with the spring 99 charged. During this condition, the release button can be depressed to effect the exposure on the film. After this exposure completes, an engagement release lever 131 operable in association with the return movement of a diaphragm system (not shown) or a mirror preset system (not shown) or with the completion of travel of the trailing shutter curtain pushes one end 129b of the engagement lever 129 to allow the latter to be pivoted clockwise against a spring 130. By this clockwise rotation of the engagement lever 129, the engagement with the downwardly extending projection 92f of the second slide plate 92 is released and, therefore, the second slide plate 92 is moved rightwards by the action of the spring 99. In this way, the film wind-up is effected in a manner similar to that described with reference to FIG. 16.

With respect to the electric circuit shown in FIG. 19, the engagement release lever 131 is moved leftwards by the manipulation of the wind-up lever 82 and returns to the illustrated position upon completion of the exposure control. Accordingly, a switch 135 is closed during the period from the time of completion of the exposure control until the wind-up lever 82 is manipulated, and therefore, an inverter 139 generates a high level signal during this period. On the other hand, the switch 100 is opened during the period from the time of completion of the film wind-up until the wind-up lever 82 is manipulated, and therefore, an inverter 137 generates a high level signal during this period. In view of this, an AND gate 141 having its inputs connected respectively to the inverters 137 and 139 generates a high level signal only during the period in which the switches 100 and 135 are simultaneously closed. As can readily be understood from the foregoing description, the period in which the switches 100 and 1345 are simultaneously closed is the period in which the film wind-up operation is effected, and during this period the transistor 173 conducts to effect the supply of the electrical power to a sprocket hole detector 171 which is in turn connected to the counter 175 as shown in FIG. 18.

It is to be noted that in the foregoing embodiments including the modifications the sprocket hole detector has been described as used in the form of a photoelectric system, especially the photo-coupler. However, it may be replaced with any other detecting system, for example, a brush contact system or an electrostatic detecting system.

In addition, although in the foregoing description it has been described that the film wind-up can be barred when, while the camera back lid is left open, the film is detected as having been turned around the take-up spool, it is possible to construct in such a manner that a visual and/or audio warning can be given when the film wind-up is so barred. In such case, it is preferable to stop the warning either when the camera back lid is closed or when the film is removed. In the latter case, it may be convenient in view of the fact that whether or not the film is loaded can be ascertained even when the camera back lid is closed.

Moreover, it has been described that, when the manual film wind-up operation is interrupted, the electrical power supply to the code perforation detector is interrupted and, at the same time, the output thereof is stored. However, the present invention is not limited thereto, but should be understood as including the contemplated construction wherein, particularly in the arrangement wherein the wind-up can be barred each time a predetermined number of the sprocket holes determined by counting output pulses from a sprocket hole detector, the electrical power supply to such sprocket hole detector can be interrupted during the interruption of the manual film wind-up operation and, at the same time, an output thereof can be stored.

Although the present invention has fully been described in connection with the preferred embodiments thereof, it is to be noted that various changes and modifications other than those recited above are also apparent to those skilled in the art, such changes and modifications being to be equally understood as included within the scope of the present invention.

We claim:

1. A photographic camera capable of being used with a roll film, which comprises:
   a spool for rolling up the film;
   means for certifying that the tip of film is fastened to said spool;
   a back lid of the camera for enclosing the roll film;
   means for detecting whether said back lid is opened or closed;
   means, responsive to said certifying means and said detecting means, for disabling the film winding up operation of the camera when the tip of film is fastened to said spool and said back lid is left open; and
   means for cancelling said disabling means.

2. A camera as claimed in claim 1, wherein said cancelling means is responsive to said detecting means to automatically cancel said disabling means when said back lid is closed.

3. A camera as claimed in claim 1, wherein said certifying means includes a plurality of switches to be each actuated when the film comes into contact with said spool at plurality of portions thereof, respectively, and means for generating a signal indicative of the fastening of the tip of film to said spool when all of said switches are actuated.

4. A camera as claimed in claim 1, further comprising means for sensing the openings located in the side track of the film to generate an output, and means responsive to at least said certifying means and said detecting means for providing said sensing means with electric power with the tip of film fastened to said spool and said back lid closed.

5. A camera as claimed in claim 4, further comprising a manually operable member for practicing the film winding up operation, means for informing whether or not said manually operable member is in operation, means responsive to said informing means for preventing said providing means from providing said sensing means with electric power when the manual operation of said manually operable member is intermitted, means for storing the output of said sensing means when the power supply to said sensing means is prevented by said preventing means, and means for replacing the output of said sensing means with the stored contents of said storing means during the power supply to said sensing means is prevented.

6. A camera as claimed in claim 1, further comprising means for signaling when the film has been wound up by said spool to a predetermined degree, and means responsive to said certifying means and said signaling means for making an indication during a period from the fastening of the tip of film till the winding up of the film to the predetermined degree.

7. A camera as claimed in claim 6, further comprising means for automatically stopping the film winding up operation in every frame, means responsive to said certifying means, to said detecting means and to said signaling means, for ceasing said stopping means from stopping the film winding up operation during a period from both the fastening of the tip of film and the closure of the back lid till the winding up of the film to the predetermined degree, means for controlling the exposure, and means responsive to said ceasing means for saving the exposure control operation of said controlling means during said period.

8. A camera as claimed in claim 1, further comprising means for operating the rewinding of the film, means responsive to said operating means for indicating that the rewinding is in operation, and means responsive to said certifying means for terminating the indication of film rewinding when the tip of film is detached from said spool.

9. A photographic camera capable of being used with a roll film, which comprises:
   a spool for rolling up the film;
   means for certifying that the tip of film is fastened to said spool;
   a back lid of the camera for enclosing the roll film;

means for detecting whether or not said back lid is opened or closed;

means for sensing the openings located in the side track of the film; and means, responsive to at least said certifying means and said detecting means, for providing said sensing means with electric power with the tip of film fastened to said spool and said back lid closed.

10. A camera as claimed in claim 9, further comprising a manually operable member for practicing the film winding up operation, means for informing whether or not said manually operable member is in operation, and means responsive to said informing means for preventing said providing means from providing said sensing means with electric power when the manual operation of said manually operable member is intermitted.

11. A photographic camera capable of being used with a roll film, which comprises:

means for sensing the openings located in the side track of the film to generate an output;

means for providing said sensing means with electric power;

a manually operable member for practicing the film winding up operation;

means for informing whether or not said manually operable member is in operation;

means, responsive to said informing means for preventing said providing means from providing said sensing means with electric power when the manual operation of said manually operable member is intermitted;

means for storing the output of said sensing means when the power supply to said sensing means is prevented by said preventing means; and means for replacing the output of said sensing means with the stored contents of said storing means during the power supply to said sensing means is prevented.

12. A photographic camera capable of being used with a roll film, which comprises:

a spool for rolling up the film;

means for sensing the openings located in the side track of the film to detect the movement of the film rolled round said spool;

means for providing said sensing means with electric power necessary to generate an output;

a manually operable member for film winding-up and shutter charging;

means for charging the shutter in response to said manually operable member;

means responsive to said manually operable member for charging a mechanical energy to be used upon film winding up operation;

means for controlling the exposure;

means for initiating the film winding up operation with said mechanical power used in response to the completion of the exposure control of said controlling means;

means for measuring the movement of the film in response to said sensing means; and means responsive to said measuring means for terminating the film winding up operation when the measured movement of film corresponds to the length of one frame.

13. A photographic camera capable of being used with a roll film, which comprises:

a spool for rolling up the film;

means for signaling when the film has been wound up by said spool to a predetermined degree;

means for certifying that the tip of film is fastened to said spool; and means, responsive to said certifying means and said signaling means, for making an indication during a period from the fastening of the tip of film till the winding up of the film to the predetermined degree.

14. A camera as claimed in claim 13, further comprising means for automatically stopping the film winding up operation in every frame, a back lid of the camera for enclosing the roll film, means for detecting whether said back lid is opened or closed, means responsive to said certifying means, to said detecting means and to said signaling means, for ceasing said stopping means from stopping the film winding up operation during a period from both the fastening of the tip of film and closure of the back lid till the winding up of the film to the predetermined degree.

15. A camera as claimed in claim 14, further comprising means for controlling the exposure, and means responsive to said ceasing means for saving the exposure control operation of said controlling means.

16. A photographic camera capable of being used with a roll film, which comprises:

a spool for rolling up the film;

means for certifying that the tip of film is fastened to said spool, said certifying means including a plurality of switches to be each actuated when the film comes into contact with said spool at plurality of portions thereof, respectively, and means for generating a first signal indicative of the fastening of the tip of film to said spool when all of said switches are actuated;

means for operating the rewinding of the film;

means responsive to said operating means for indicating that the rewinding is in operation; and means, responsive to said certifying means, for terminating the indication of film rewinding at a condition in which said first signal cannot be generated.

17. A camera as claimed in claim 16, wherein said certifying means further includes means for generating a second signal when none of said switches is actuated, and wherein said indication terminating means is responsive to said second signal.

* * * * *